United States Patent
Terazaki et al.

(10) Patent No.: US 7,758,822 B2
(45) Date of Patent: Jul. 20, 2010

(54) REACTOR DEVICE

(75) Inventors: Tsutomu Terazaki, Fussa (JP); Tadao Yamamoto, Tokyo (JP)

(73) Assignee: Casio Computer Co., Ltd., Tokyo (JP)

( * ) Notice: Subject to any disclaimer, the term of this patent is extended or adjusted under 35 U.S.C. 154(b) by 724 days.

(21) Appl. No.: 11/654,452

(22) Filed: Jan. 17, 2007

(65) Prior Publication Data

US 2007/0166581 A1      Jul. 19, 2007

(30) Foreign Application Priority Data

Jan. 17, 2006  (JP) ............................. 2006-008794
Sep. 27, 2006  (JP) ............................. 2006-263167

(51) Int. Cl.
*A62D 3/00* (2007.01)
*B01J 19/00* (2006.01)

(52) U.S. Cl. ...................... 422/199; 422/129; 48/127.9; 429/20; 429/26; 429/30; 429/34; 429/44

(58) Field of Classification Search ................. 422/199, 422/129; 48/127.9; 429/20, 26, 30, 34, 44
See application file for complete search history.

(56) References Cited

U.S. PATENT DOCUMENTS

| | | | | |
|---|---|---|---|---|
| 4,950,562 | A | * | 8/1990 | Yoshida et al. ................. 429/32 |
| 6,130,502 | A | * | 10/2000 | Kobayashi et al. ........... 313/446 |
| 2003/0190508 | A1 | * | 10/2003 | Takeyama et al. ............. 429/20 |
| 2004/0025784 | A1 | * | 2/2004 | Kawamura et al. .......... 117/200 |
| 2005/0172554 | A1 | | 8/2005 | Basho et al. |

FOREIGN PATENT DOCUMENTS

| | | |
|---|---|---|
| JP | 2004-030972 | 1/2004 |
| JP | 2004-241356 A | 8/2004 |
| JP | 2005-154215 | 6/2005 |
| JP | 2006-179288 A | 7/2006 |

OTHER PUBLICATIONS

Japanese Office Action dated Nov. 26, 2008 and English translation thereof issued in counterpart Japanese Application No. 2006-263167.
Chinese Office Action (and English translation thereof) dated May 16, 2008, issued in a counterpart Chinese Application.

* cited by examiner

*Primary Examiner*—Walter D Griffin
*Assistant Examiner*—Natasha Young
(74) *Attorney, Agent, or Firm*—Frishauf, Holtz, Goodman & Chick, P.C.

(57) ABSTRACT

A reactor device includes a reactor including at least one reacting unit supplied with a reactant to cause a reaction, a terminal portion provided at the reacting unit, and an electrically conductive member comprising an electrically conductive material and connected to the terminal portion, a space which extends between the terminal portion and an end face of the reactor, wherein the electrically conductive member is routed to outside the reactor through the space from the terminal portion to the end face of the reactor, and the electrically conductive member is fixed to the reactor at the end face.

30 Claims, 18 Drawing Sheets

REACTOR DEVICE

CROSS-REFERENCE TO RELATED APPLICATIONS

This application is based upon and claims the benefit of priority from prior Japanese Patent Applications No. 2006-008794, filed Jan. 17, 2006; and No. 2006-263167, filed Sep. 27, 2006, the entire contents of both of which are incorporated herein by reference.

BACKGROUND OF THE INVENTION

1. Field of the Invention

The present invention relates to a reactor device to which a reactant is supplied, and which causes a reaction of the reactant.

2. Description of the Related Art

In recent years, attention has been focused on a fuel cell serving as a clean power supply having a high energy conversion efficiency. This fuel cell has been widely practically available for use in fuel cell automobiles, electric housings and the like. In addition, in portable electronic equipment such as a cellular phone or a notebook type personal computer in which research and development of downsizing is rapidly promoted as well, practical use of a power supply using a fuel cell has been discussed.

The fuel cell is configured to have electric power generation cells that generate electric energy by an electrochemical reaction of hydrogen. In the case of a reforming fuel cell that reforms a fuel to generate hydrogen, it is necessary to provide a reactor having a reformer or the like, for generating hydrogen from a fuel, in addition to the fuel cell. Thermal energy is required to generate hydrogen in the reformer, and it is necessary to set a reaction temperature at a predetermined value. Therefore, a heater is provided in the reformer, and an electrode of the heater is formed on a surface of the fuel reformer. A lead wire is connected to the electrode via wire bonding, for example, and the heater is heated by applying a voltage via the lead wire so as to set the reformer at a predetermined reaction temperature.

In this case, since the heater is provided in the fuel reformer, wiring must be laid out from the heater to an electrode on the surface of the fuel reformer. However, if such wiring is not sufficiently joined to the fuel reformer, fuel, for example, can leak through a gap.

In addition, as described above, the reformer is heated to be set at the predetermined temperature. Thus, a stress due to thermal expansion is applied to the lead wire connected to the heater electrode, and the lead wire can break.

On the other hand, in order to enhance electric power generation efficiency in the fuel cell, development has been promoted of a solid oxide fuel cell (hereinafter, referred to as SOFC) that can enhance electric power generation efficiency in order to achieve actuation at a high temperature. In this SOFC, an electric power generation cell is used in which a fuel electrode is provided on one face of a solid oxide type electrolyte and an oxygen electrode is provided on the other face.

In this SOFC, a reaction is carried out at a comparatively high temperature (about 500° C. to 1000° C.). Thus, electric power generation cells are housed in a heat insulation container. In addition, pipelines serving as supply flow pathways of a fuel gas or oxygen and discharge flow pathways of discharge gas; an anode output electrode; and a cathode output electrode are connected to the electric power generation cells and are routed through the heat insulation container.

Here, in the SOFC, an operating temperature of the electric power generation cells is high, and thus, a temperature difference between each of the pipelines exposed to the outside, the anode output electrode and the cathode output electrode; and the electric power generation cells increases. Therefore, a thermal loss due to the leakage of the heat of the electric power generation cells to the outside is prone to increase.

In addition, for example, at the time of startup, as the electric power generation cells are heated, the pipelines and output electrodes thermally expand. Thus, a thermal stress is applied, whereby equipment can break.

BRIEF SUMMARY OF THE INVENTION

The present invention has an advantage that the leakage of a reactant can be prevented; short-circuit or equipment breakage due to a thermal stress can be prevented; and a thermal loss can be reduced in a reactor device supplied with the reactant to cause a reaction.

In order to achieve the above-described advantage, according to one aspect of the present invention a reactor device includes: a reactor including at least one reacting unit supplied with a reactant to cause a reaction; a terminal portion provided at the reacting unit; and an electrically conductive member made of an electrically conductive material and connected to the terminal portion; wherein the electrically conductive member is drawn to the outside from an end face of the reactor, and is fixed at a site drawn to the outside, and wherein a space is provided at a periphery of the electrically conductive member between the terminal portion and the end face of the reactor.

According to another aspect of the present invention a reactor device includes: a plurality of reacting units which are set at different temperatures and which are supplied with a reactant to cause a reaction; a heat insulation container which houses the plurality of reacting units via a heat insulation space; a terminal portion provided at a reacting unit at which a set temperature is highest, among the plurality of reacting units; and an electrically conductive member which is made of an electrically conductive material and is connected to the terminal portion, wherein the electrically conductive member is drawn to the outside from a wall face of the heat insulation container, and is fixed at a site at which it is routed through the wall face, and wherein a distance from the wall face of the heat insulation container through which the output electrode is drawn to the reacting unit at which the terminal portion is provided is longer than a distance from the wall face to any other of the reacting units.

According to a further aspect of the present invention, electronic equipment includes a reactor device. The reactor device includes: a reactor having a reacting unit which is set at a predetermined temperature, and which includes an electric power generation cell supplied with a power generation fuel to generate electric power by an electrochemical reaction of the power generation fuel; a heat insulation container which houses the reacting unit via a heat insulation space; a connection terminal which is provided at the electric power generation cell and is formed by an output terminal which outputs the electric power; and an output electrode which is formed by an electrically conductive member, is connected to the output terminal, is routed through a wall face of the heat insulation container so as to be drawn to the outside, and is fixed at a site at which it is routed through the wall face. A load in the electronic equipment is driven by the electric power generated by the electric power generation cell in the reactor device.

According to a further aspect of the present invention, electronic equipment includes a reactor device. The reactor device includes: a reformer which is supplied with a source fuel to generate a power generation fuel; an electric power generation cell which is set at a higher temperature than the reformer, and which is supplied with the power generation fuel to generate electric power by an electrochemical reaction of the power generation fuel; a heat insulation container which houses the reacting unit via a heat insulation space; a connection terminal which is provided at the electric power generation cell and formed by an output terminal which outputs the electric power; and an output electrode which has a first end that is connected to the output terminal and a second end that is routed through a wall face of the heat insulation container so as to be drawn to the outside and fixed at a site at which it is routed through the wall face, wherein a distance from the wall face from which the output electrode is drawn to the electric power generation cell is longer than a distance from the wall face to the reformer. A load is coupled to the second end of the output electrode of the fuel cell device, and the load is driven by the electric power taken out from the electric power generation cell.

DETAILED DESCRIPTION OF THE INVENTION

Now, a reactor device according to the present invention will be described in detail by way of embodiments shown in the accompanying drawings. In the embodiments described below, while a variety of limitations that are technically preferable are applied in order to carry out the present invention, the description of the embodiments below does not imply that the scope of the invention is limited to the following embodiments and illustrative examples.

First Embodiment

First, a first embodiment of the reactor device according to the present invention will be described. The composite microscopic reactor device according to the first embodiment is shown in FIGS. 1-4.

Figure 1:
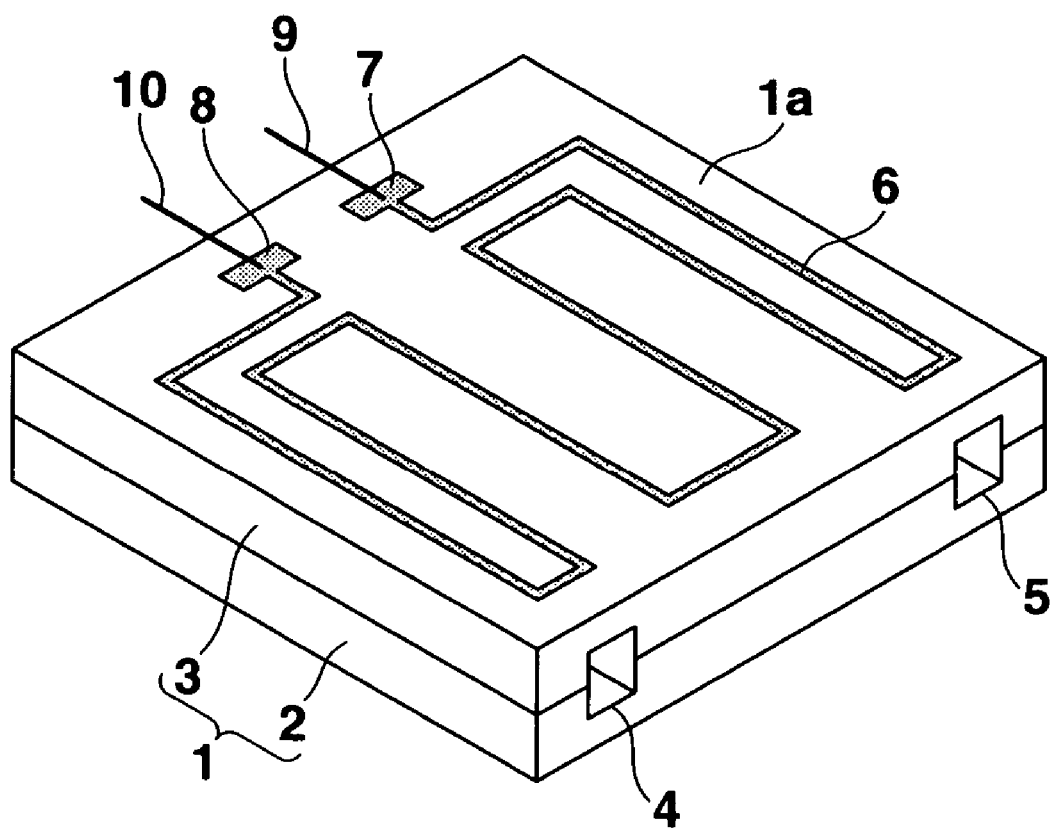
FIG. 1 is a perspective view showing a reactor of a composite microscopic reactor device according to a first embodiment of the present invention.

As shown in FIG. 1, an electric heat pattern 6, which is a heating electric resistor, is formed on a surface of a reactor 1. Specifically, on one flat face 1a among a plurality of faces of the reactor 1, electric heat films are formed, and these electric heat films are shape-processed using a photolithography technique or an etching technique to form the electric heat pattern 6. Heating using the electric heat pattern 6 occurs when a predetermined voltage is applied to the electric heat pattern 6, and an electric resistance of the electric heat pattern 6 changes in accordance with a temperature of the electric heat pattern 6 itself. Thus, the electric heat pattern 6 also functions as a temperature sensor via which a temperature change can be read from a change of a resistance value. The electric heat pattern 6 includes: a heat layer including gold (Au) having a resistance value with good reproducibility; a diffusion restriction layer which contacts the heat layer (for example, the top and bottom of the heat layer) and includes a high melting point metal such as tungsten which is hardly thermally diffused in the heat layer; and an intimate contact layer including a metal such as tantalum, molybdenum, titanium, or chrome, which is interposed between the diffusion restriction layer and the surface of the reactor 1 in order to improve intimacy of contact between the diffusion restriction layer and the reactor 1. The electric heat pattern 6 is laid out so as to overlap a site to be heated to a predetermined temperature.

In addition, when the reactor 1 is an electrically conductive member, it is sufficient if an insulation film is formed on the face 1a of the reactor 1 in order to electrically insulate the heat insulation pattern 6 from the reactor 1. In the case where the reactor 1 is an insulation member, there is no need for further interposing an insulation film on a surface of the face 1a.

At the time of forming the electric heat pattern 6, both ends of the electric heat pattern 6 are made to be wider than the rest of the electric heat pattern 6, and then, the wide ends of the electric heat pattern 6 are used as connection terminal portions 7 and 8. The connection terminal portions 7 and 8 are formed in a substantially rectangular shape, and are provided in the vicinity of a rim (edge) of the face 1a on which the electric heat pattern 6 has been formed.

The reactor 1 includes a plurality of substrates having grooves or recessed portions formed thereon. The substrates are joined to overlap on each other such that the grooves or recessed portions are covered with the substrates. The grooves serve as, for example, reaction pathways that form-flow pathways in which a reactant flows, and the recessed portions, for example, serve as relatively large (with respect to the grooves) internal spaces where a reaction occurs.

A main material for the reactor 1 can be properly selected from glass, ceramics, metal and the like. Depending on the usage of the reactor 1, a catalyst may be provided on a wall face of a groove or a recessed portion of the reactor 1. For example, when the reactor 1 is used as a hydrogen reformer for reforming hydrogen to be supplied to a fuel cell, a reforming catalyst (for example, a Cu/ZnO-based catalyst) is provided on the wall face of the groove or recessed portion defining a flow pathway and an internal space. In addition, when the reactor 1 is used as a carbon monoxide remover, a carbon monoxide selective oxidization catalyst (for example, platinum, ruthenium, palladium, or rhodium) is provided on the wall face of the groove or recessed portion. When the reactor 1 is used as a vaporizer, no catalyst is provided.

According to the present invention, catalysts may be, for example, directly solidified in the reactor 1, whereby the catalysts directly adhere to the wall surface of the groove or recessed portion where the catalyst is provided, or the catalysts may be carried by a carrier made of aluminum oxide or the like, which is provided as a film on the groove or recessed portion of the reactor 1.

In addition, plural types of catalysts may be provided on (directly or with a carrier) the groove or recessed portion of the reactor 1, and the reactor 1 may be a complex of reactors that cause plural types of reactions depending on the types of catalysts. For example, the reactor 1 may be a composite complex in which a certain flow pathway serves as a reactor furnace of a reformer that generates hydrogen from a fuel and water and in which the subsequent flow pathway serves as a reactor furnace of a carbon monoxide remover that removes carbon monoxide by oxidizing the carbon monoxide contained in a product generated by the reformer.

In FIG. 1, two substrates 2 and 3 are joined with each other to form the reactor 1, and an inlet 4 and an outlet 5 communicating with an internal flow pathway and an internal space are formed on a side face of the reactor 1. In this case, the substrate 3 corresponds to a first substrate, and a heater sealing substrate 20 described later corresponds to a second substrate.

The steps of forming the electric heat pattern 6 may be carried out before or after assembling the reactor 1. That is, after the electric heat pattern 6 has been formed on a top or bottom substrate, the top and bottom substrates may be joined. Alternatively, after the top and bottom substrates have been joined, the electric heat pattern 6 may be formed on a face of the top or bottom substrate opposite to the junction face of the substrate.

After forming the electric heat pattern 6, the electric heat pattern 6 is covered by a protective insulation film (for example, silicon nitride or silicon oxide), which is then patterned so as to cover the electric heat pattern 6 except for the connection terminal portions 7 and 8. The connection terminal portions 7 and 8 may be partially covered by the insulation film. Then, a lead wire 9 is joined with the connection terminal portion 7 and a lead wire 10 is joined with the connection terminal portion 8 by wire bonding.

For example, to perform a junction method to join the lead wires 9 and 10 to the connection terminal portions 7 and 8, an end of the lead wire 9 is laid out at the terminal portion 7; pressure is applied from above with electrodes having an insulation material sandwiched therebetween; and resistance welding is carried out utilizing a resistance heat caused by supplying power to the lead wire 9. Then, an end of the lead wire 10 is laid out at the terminal portion 8; pressure is applied from above with electrodes having an insulation material therebetween; and resistance welding is carried out utilizing a resistance heat caused by supplying power to the lead wire 10. The lead wires 9 and 10 may be, for example, a kovar wire, an iron-nickel alloy wire, a DUMET wire (produced by covering core material of iron-nickel alloy with copper) or the like. The steps of bonding the lead wires 9 and 10 may be carried out before or after applying and patterning the protective insulation film as described above.

Figure 2:
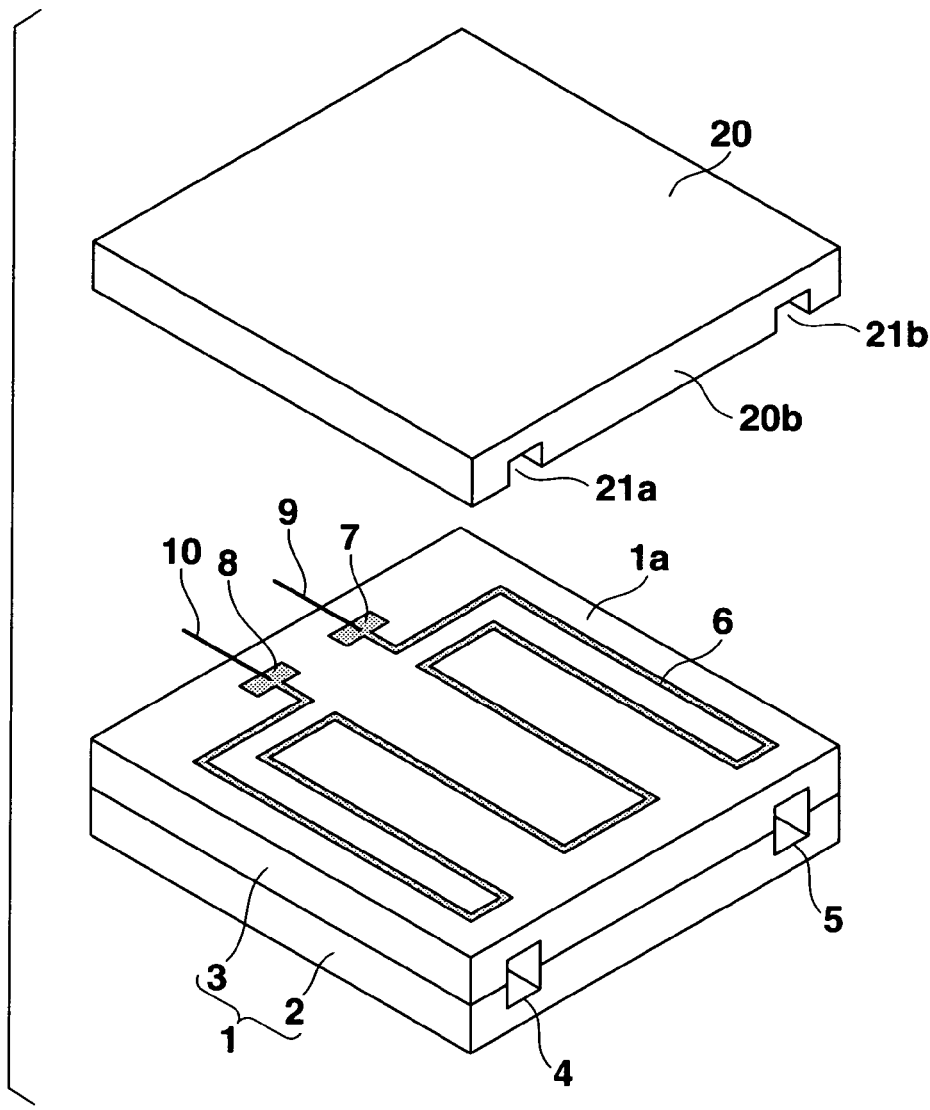
FIG. 2 is a perspective view of the reactor and a heater sealing substrate in the first embodiment seen from above.
Figure 3:
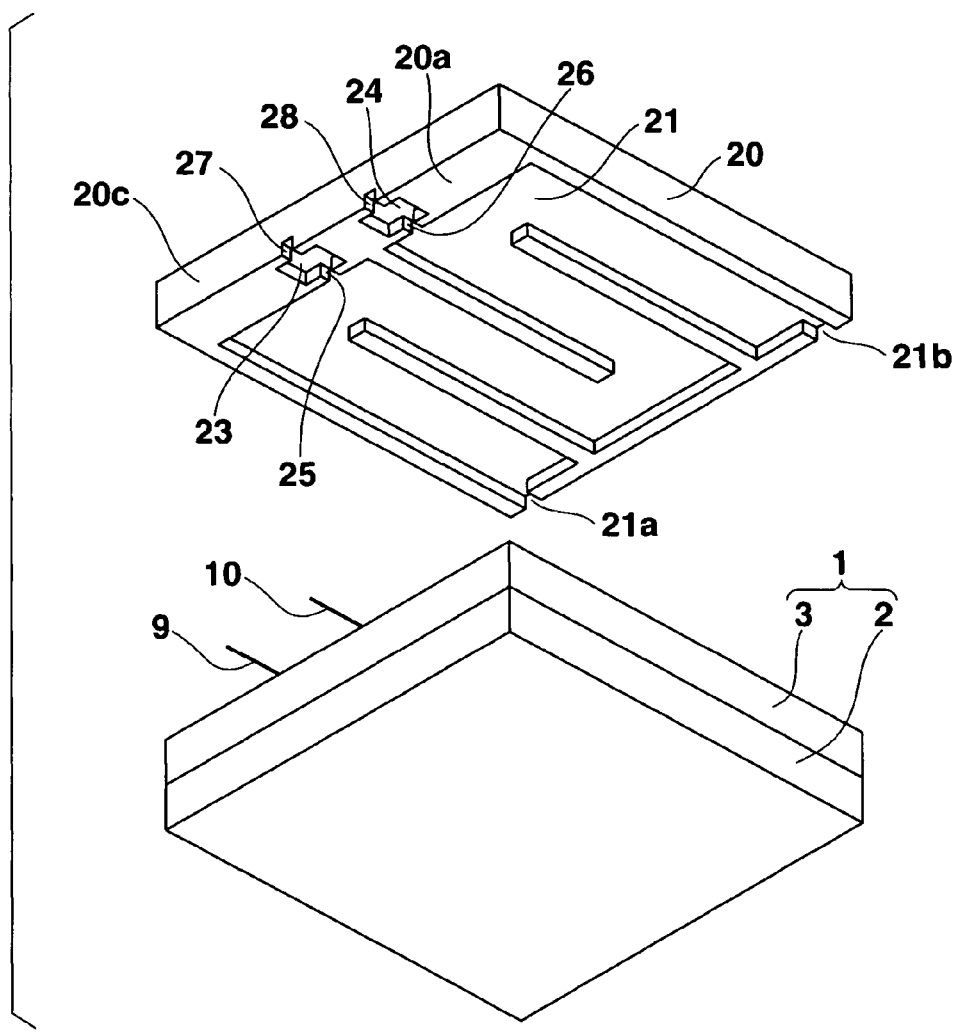
FIG. 3 is a perspective view of the reactor and the heater sealing substrate in the first embodiment seen from below.

The heater sealing substrate 20 is prepared as shown in FIGS. 2 and 3.

On one face 20a of the heater sealing substrate 20, a zigzag-shaped groove 21 serving as an electric heat pattern housing chamber is recessed using a sand blast technique or a photo-lithography etching technique.

At the time of recessing the groove 21, a first end 21a of the groove 21 is caused to communicate with a rim of the heater sealing substrate 20 so as to be opened on one side end face 20b of the heater sealing substrate 20, and the second end 21b of the groove 21 is caused to communicate with the rim of the heater sealing substrate 20 so as to be opened on the side end face 20b of the heater sealing substrate 20.

In addition, in the vicinity of the rim part of the bottom face 20a, two substantially rectangular terminal portion housing chambers 23 and 24 are recessed independently of the groove 21, and then, communication grooves 25 and 26 are recessed to cause the terminal portion housing chambers 23 and 24 to communicate with the groove 21.

Routing grooves 27 and 28 are recessed to make the terminal portion housing chambers 23 and 24 communicate with a rim face of the heater sealing substrate 20, and then, the ends of the routing grooves 27 and 28 are opened on a side end face 20c opposite to the side end face 20b of the heater sealing substrate 20. The routing grooves 27 and 28 are not necessarily formed in a linear shape. The routing grooves 27 and 28 may, for example, be formed in a bent shape.

A width of each of the communication grooves 25 and 26 is slightly larger than a wiring width of the electric heat pattern 6, and the width of each of the communication grooves 25 and 26 is shorter than a width of each of the terminal portion housing chambers 23 and 24 and shorter than a width of each of the connection terminal portions 7 and 8.

A width of each of the routing grooves 27 and 28 is slightly larger than a wiring width of each of the lead wire 9 and the lead wire 10, and the width of each of the routing roves 27 and 29 is shorter than the width of each of the terminal portion housing chambers 23 and 24 and shorter than the width of each of the connection terminal portions 7 and 8.

A width of each of the terminal portion housing chambers 23 and 24 is slightly larger than the width of each of the connection terminal portions 7 and 8; and a length of each of the terminal portion housing chambers 23 and 24 is slightly larger than a length of each of the connection terminal portions 7 and 8. In this manner, the terminal portion housing chambers 23 and 24 can house the connection terminal portions 7 and 8 at an inside of the terminal portion housing chambers 23 and 24.

While the terminal portions 7 and 8 each are formed in a rectangular shape, for example, they may be formed in any shape other than the rectangular shape, such as an elliptical shape. The terminal portion housing chambers 23 and 24 are not limited in shape as long as they have dimensions that are slightly larger than the dimensions of the connection terminal portions 7 and 8 so as to house the terminal portions.

An aggregate recessed portion of the heater sealing substrate 20 is formed by the groove 21, terminal portion housing chambers 23 and 24, communication grooves 25 and 26, and routing grooves 27 and 28.

A main material for the heater sealing substrate 20 can be properly selected from glass, ceramics, metal or the like in accordance with the material of the reactor 1.

The face 20a of the heater sealing substrate 20 which has the groove 21 formed therein is joined with the face 1a of the reactor 1 on which the electric heat pattern 6 is formed.

Figure 4:
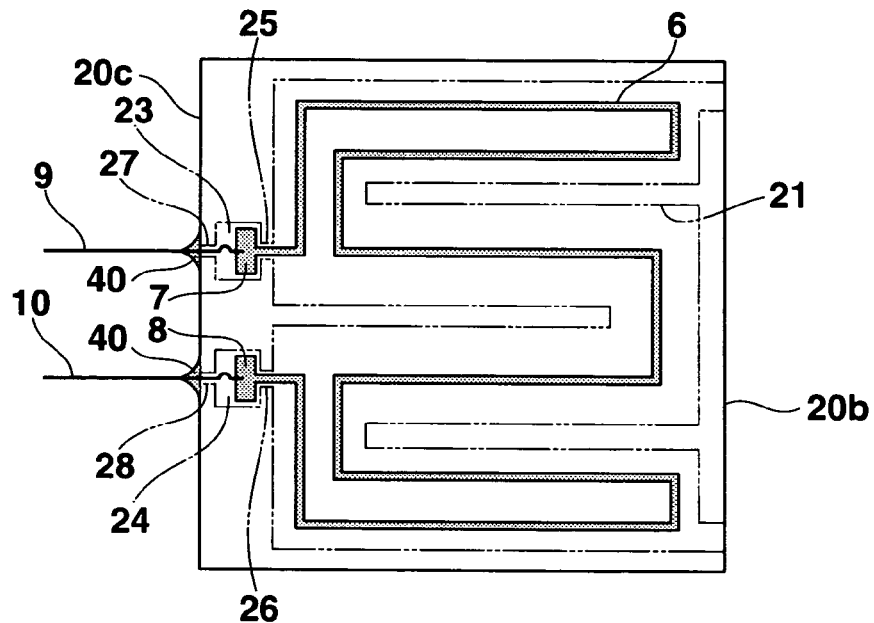
FIG. 4 is a plan view showing a junction face of the reactor in the first embodiment.

As shown in FIG. 4, the shapes of the electric heat pattern 6, the groove 21, the terminal portion housing chambers 23 and 24, the communication grooves 25 and 26, and the routing grooves 27 and 28 are determined so that: the terminal portion 7 is laid out inside a rim of the terminal portion housing chamber 23; the terminal portion 8 is laid out inside a rim of the terminal portion housing chamber 24; and the electric heat pattern 6 is laid out inside the rims of the groove 21 and the communication grooves 25 and 26.

Next, a combustion catalyst (for example, platinum, ruthenium, palladium, or rhodium) is provided on a wall face of the groove 21. The combustion catalyst is provided as a catalyst for combusting a fuel gas by oxidizing a combustion gas (for example, hydrogen gas, methanol gas, ethanol gas, dimethyl ether gas and the like).

Next, the face 1a of the reactor 1 and the face 20a of the heater sealing substrate 20 are adhered to each other. In this manner, a combustor equipped with the combustion catalyst is formed.

In adhering the reactor 1 and the heater sealing substrate 20, alignment between the reactor 1 and the heater sealing substrate 20 is carried out so that the electric heat pattern 6 is housed in the groove 21 and the communication grooves 25 and 26; the terminal portion 7 is housed in the terminal portion housing chamber 23; the terminal portion 8 is housed in the terminal portion housing chamber 24; and the lead wires 9 and 10 are engaged into the routing grooves 27 and 28. Then, the electric heat pattern 6 is covered with the heater sealing substrate 20.

Then, the face 1a of the reactor 1 is joined with the face 20a of the heater sealing substrate 20. Anode junction, brazing and the like can be selected as techniques for joining the reactor 1 with the heater sealing substrate 20, depending on a material for the reactor 1 and the heater sealing substrate 20. The groove 21, the terminal portion housing chambers 23 and 24, the communication grooves 25 and 26, and the routing grooves 27 and 28 are covered by joining the heater sealing substrate 20 with the reactor 1.

In the terminal portion housing chambers 23 and 24, the lead wires 9 and 10 are curved in an arc shape; or are bent a plurality of times; or are bent in a waveform, whereby the lead wires 9 and 10 are slackened in the terminal portion housing chambers 23 and 24. By thus slackening the lead wires 9 and 10, a length of each of the lead wires 9 and 10 from the connection terminal portions 7 and 8, respectively, to the rim of the face 20a is equal to or greater than 1.5 times a linear distance from each of the connection terminal portions 7 and 8 to the face 20a.

Next, in a state in which the inserted lead wires 9 and 10 are joined with the connection terminal portions 7 and 8, a sealing agent 40 (for example, low melting point glass sealing agent) is applied to openings of the routing grooves 27 and 28 on the side end face 20c so as to seal the openings of the routing grooves 27 and 28 with the sealing agent 40. By applying the sealing agent, the openings of the routing grooves 27 and 28 are completely closed by means of the sealing agent, whereby air tightness is secured. In addition, the terminal portion housing chambers 23 and 24 are prevented from being completely sealed (filled with sealing agent) so as to maintain a space in which the lead wires 9 and 10 can be easily slackened when a stress is applied to the lead wires 9 and 10. A material having a thermal expansion coefficient substantially equal to the thermal expansion coefficient of each of the lead wires 9 and 10 is desired as a sealing agent. For example, in the case where the lead wires 9 and 10 are kovar wires, a low melting point glass sealing agent is preferred as a sealing agent. If the reactor 1 is made of metal, a material having a lower melting point than the metal of the reactor 1 is preferred such that the expansion coefficient is approximately the same as the expansion coefficient of the reactor 1.

Next, pipelines made of a material tailored for the reactor 1, which is made of glass, ceramics, or metal and the like, are engaged into each of the inlet 4 and the outlet 5. The pipelines are engaged into openings at both ends of the groove 21, respectively, and then, the pipelines are joined with the reactor 1 and the heater sealing substrate 20. The pipelines are provided to introduce a reactant reacted by the reactor device and to lead out the reacted product resulting from the reaction to the outside of the reactor device.

Then, in a manufacturing apparatus in an atmosphere whose pressure has been reduced to 10 Pa or less, and desirably, to 1 Pa or less, the reactor 1 and the heater sealing substrate 20 are housed in a heat insulation package made of glass, ceramics, metal and the like in accordance with the material for the pipelines. Then, the pipelines engaged into the openings of the inlet 4, the outlet 5, and the groove 21 are routed through the heat insulation package, and then, sites at which the pipelines have been routed through the heat insulation package are sealed with a sealing agent. Further, the lead wires 9 and 10 are also routed through the heat insulation package, and the sites at which the lead wires 9 and 10 have bean routed through the heat insulation package are sealed with the sealing agent. Therefore, the air pressure in the heat insulation package can be maintained to be depressurized to 10 Pa or less, and desirably, to 1 Pa or less. Such a low-pressure atmosphere is low in heat conductivity, and an advantageous effect of maintaining the reactor 1 and the heater sealing substrate 20 in a heated state is attained.

In addition, thermal efficiency is improved when an infrared ray reflection film, made of, for example, as Au, Ag, or Al, so as to have a higher reflection index in the infrared region than a reflection index in the infrared region of the heat insulation package is formed on an internal face of the heat insulation package.

In this composite microscopic reactor device, the electric heat pattern 6 is heated by applying a voltage between the lead wires 9 and 10. At this time, a combustion gas is fed via a pipeline from one of the first end 21a and the second end 21b to a flow pathway of the groove 21 together with oxygen (air), whereby the combustion gas is combusted by means of a combustion catalyst, and a combustion heat is generated. The combusted discharge gas is discharged from the other one of the first end 21a and the second end 21b. A reactant is fed into the inlet 4 via a pipeline, whereby the reactant flows in a flow pathway or an internal space provided in the reactor 1, and then, the reactant is heated by the heat of the electric heat pattern 6 and/or the combustion heat generated in the groove 21, and a reaction of the reactant takes place.

For example, when the catalyst contained in the reactor 1 is a reforming catalyst and a mixture gas of methanol gas and water is supplied as a reactant, chemical reactions as shown in formulas (1) and (2) below take place.

In addition, when the catalyst contained in the reactor 1 is a carbon monoxide removing catalyst, and a hydrogen gas, an oxygen gas, a carbon monoxide gas (all or part of of the product generated by the reactions of formulas (1) and (2) below) and the like are supplied as a reactant, carbon monoxide is selectively oxidized as shown in formula (3) below.

Still further, the reaction in the reactor 1 may be a reaction with a state change as well as a chemical reaction. For example, a catalyst is not provided in the reactor 1 is not carried and a liquid (for example, a mixture solution of water and methanol) is supplied as a reactant, the liquid vaporizes.

Yet still further, as shown in formula (4) below, the combustion gas and oxygen are fed to a flow pathway of the groove 21 whose surface is provided with the combustion catalyst, whereby the combustion gas is combusted by the combustion catalyst, and combustion heat is generated.

$$CH_3OH + H_2O \rightarrow 3H_2 + CO_2 \quad (1)$$

$$2CH_3OH + H_2O \rightarrow 5H_2 + CO + CO_2 \quad (2)$$

$$2CO + O_2 \rightarrow 2CO_2 \quad (3)$$

$$2CH_3OH + 3O_2 \rightarrow 2CO_2 + 4H_2O \quad (4)$$

As described above, according to the present embodiment, while the electric heat pattern 6 is formed on the junction face 1a of the reactor 1, and the electric heat pattern 6 is housed in the groove 21 of the heater sealing substrate 20, the heater sealing substrate 20 is joined with the reactor 1. Thus, the heat irradiation emitted from a combustor provided so as to come into contact with the electric heat pattern 6 and the reactor 1 is directly transferred to the reactor 1, or alternatively, is reflected by means of the infrared ray reflection film provided on the internal face of the heat insulation package, and then is transferred to the reactor 1. Therefore, heat is efficiently used for reaction of the reactant in the reactor 1.

In addition, the electric heat pattern 6 formed on the surface of the reactor 1 is housed in the groove 21, the communication grooves 25 and 26 or the like of the heater sealing substrate 20, thus enhancing intimacy between the heater sealing substrate 20 and the reactor 1. In addition, the routing grooves 27 and 28 penetrate up to the rim of the heater sealing substrate 20 and open at the rim; and the lead wires 9 and 10 are routed through the routing grooves 27 and 28. Thus, the intimacy between the heater sealing substrate 20 and the reactor 1 is not lowered by the presence of the lead wires 9 and 10. In this manner, the intimacy between the heater sealing substrate 20 and the reactor 1 can be enhanced, thus making it possible to prevent leakage of the heat of the electric heat pattern 6 or the combustion gas contained in the groove 21.

In addition, the openings at the ends of the routing grooves 27 and 28 are sealed with a sealing agent, so that the heat generated in the electric heat pattern 6 is not released, and the generated heat is efficiently used for the reaction of the reactant in the reactor 1. In addition, by sealing the openings at the ends of the routing grooves 27 and 28 with the sealing agent the combustion gas supplied to the groove 21 can be prevented from leaking from these openings.

In addition, with the structure of the first embodiment of the present invention a combustion gas is supplied to the groove 21 so that the heat of the electric heat pattern 6 is utilized for catalytic combustion of the combustion gas. In particular, the electric heat pattern 6 is exposed in the groove 21 so that the heat generated from the electric heat pattern 6 can be efficiently utilized for catalytic combustion of the combustion gas.

Second Embodiment

Now, a second embodiment of the reactor device according to the present invention will be described with respect to FIGS. 5-14.

Figure 5:
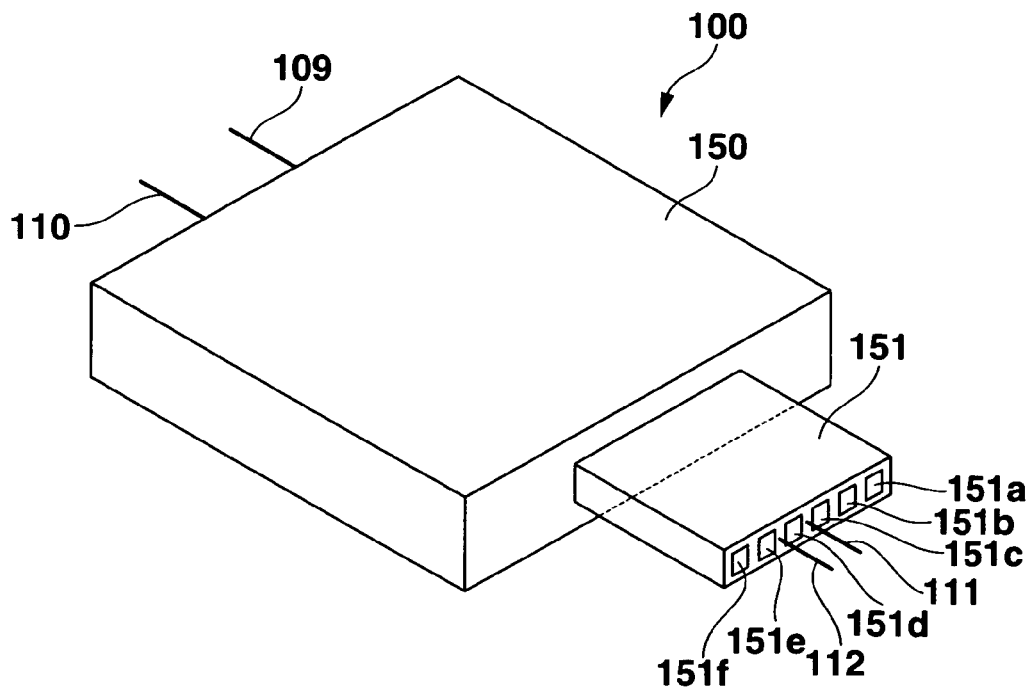
FIG. 5 is an external perspective view showing a composite microscopic reactor device according to a second embodiment of the present invention.
Figure 6:
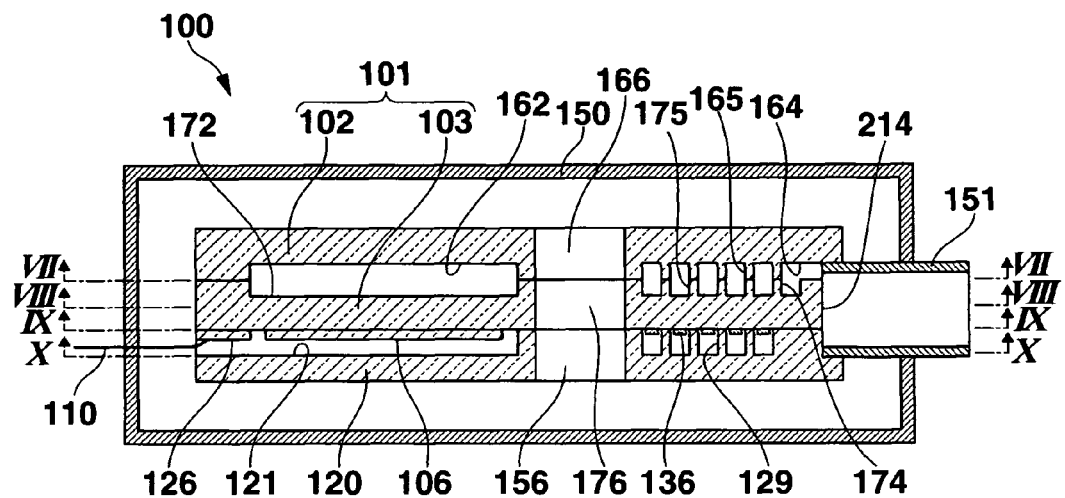
FIG. 6 is a sectional view showing the composite microscopic reactor device in the second embodiment.

The reactor device in the second embodiment is a composite microscopic reactor device 100 shown in FIGS. 5 and 6, which includes a glass-based or a metal-based heat insulation package 150. As shown in FIGS. 5 and 6, the heat insulation package 150 is a hexahedron shaped box body having a hollow interior. An infrared ray reflection film (for example, Au, Ag, and Al) having a higher reflection index in the infrared region than a reflection index in the infrared region of the heat insulation package 150 is formed on the internal wall face of the heat insulation package 150. An atmospheric pressure of the hollow of the heat insulation package 150 is maintained in a state in which the pressure has been reduced to 10 Pa or less, and more desirably, to 1 Pa or less.

In addition, a supply discharge member 151 formed of the same material as the heat insulation package 150 is routed through the heat insulation package 150. The supply discharge member 151 includes: a fuel supply flow pathway for supplying a reforming fuel gas; two suction flow pathways for supplying air; a combustion gas supply flow pathway for supplying a combustion gas; a generated-gas discharge flow pathway for discharging a generated gas; and a discharge gas discharge flow pathway for discharging a combustion discharge gas. In addition, lead wires 109 to 112 are routed through the heat insulation package 150. The lead wires 109 to 112 may be, for example, a kovar wire, an iron nickel alloy wire, or a DUMET wire. Sites at which the supply discharge member 151 and the lead wires 109 to 112 are routed into the heat insulation package 150 are sealed by a sealing agent.

A reactor 101 is housed in the heat insulation package 150. The reactor 101 is formed of a bottom substrate 103 and a top substrate 102 joined to each other as a first substrate, and a heater sealing substrate 120 serving as a second substrate is joined with a bottom face of the reactor 101, (i.e., a bottom face of the bottom substrate 103), and is also housed in the heat insulation package 150. The reactor 101 is (serves as) a composite body of a reformer and a carbon monoxide remover, and the heater sealing substrate 120 joined with the bottom substrate 103 is (serves as) a combustor.

With this structure, the portion of the lead wires 109 to 112 laid out in the combustor are heated by the combustor, whereas portions of the lead wires 109 to 112 that are exposed to the outside of the combustor, in particular, the portions outside of the heat insulation package 150, are at a lower temperature than the temperature at which heating is carried out by means of the combustor. Thus, the heat contained in the combustor is prone to leak to outside the combustor via the lead wires 109 to 112. It is preferable, therefore, that a diameter of each of the lead wires 109 to 112 should be 0.2 mm or less from the viewpoint of thermal efficiency, thereby reducing a heat capacity and a sectional area thereof.

Figure 7:
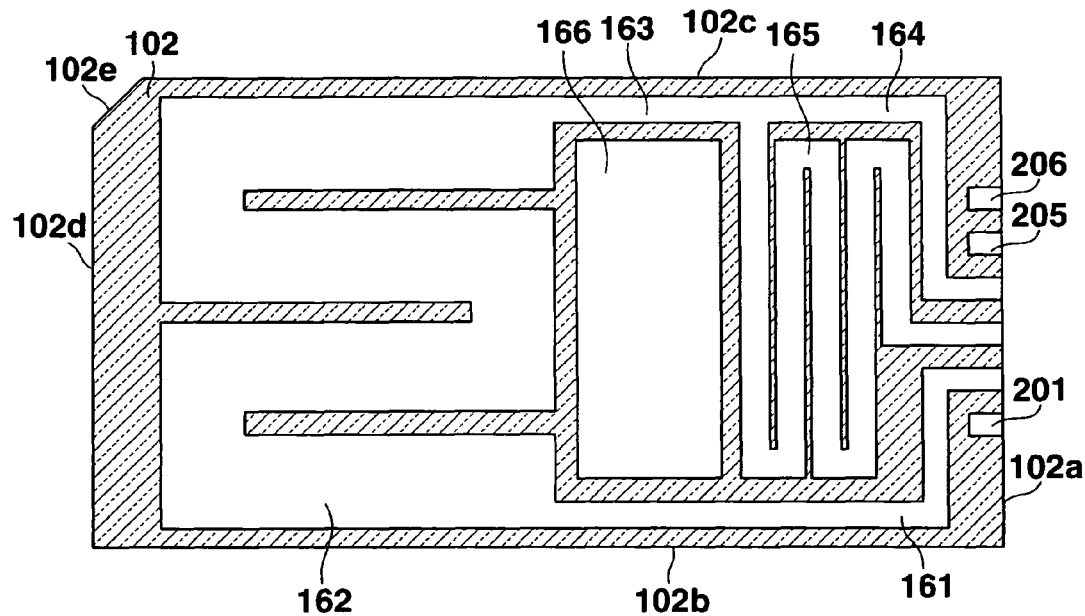
FIG. 7 is a sectional view showing top substrate 102 on a plane taken along line VII-VII of FIG. 6.

FIG. 7 is an arrow-direction sectional view of the reactor 101 along line VII-VII of FIG. 6.

As shown in FIG. 7, in a face of the top substrate 102 joined to the bottom substrate 103, there are recessed: a fuel supply flow pathway portion 161; a reforming flow pathway portion 162 serving as a reforming reactor furnace; a communication groove 163; an air supply flow pathway portion 164; and a carbon monoxide removal flow pathway portion 165 serving as a carbon monoxide removal reactor furnace, all formed by a groove portion or a recessed portion. In addition, a rectangular through-hole 166 extending through the top substrate 102 in a thickness direction thereof is formed at a center part of the top substrate 102.

A plurality of ends (such as grooves) provided on the top substrate 102 to be connected with pipelines are formed only on one rim 102a of the top substrate 102. The fuel supply flow pathway portion 161 is formed to extend from the rim 102a to a rim 102b adjacent to the rim 102a and to extend along the rim 102b. A first end of the fuel supply flow pathway portion 161 communicates with the rim 102a of the top substrate 102, and a second end of the fuel supply flow pathway portion 161 communicates with a first end of the reforming flow pathway portion 162.

The reforming flow pathway portion 162 is formed in a zigzag shape at the left side of the through-hole 166.

The communication groove 163 is formed along a rim 102c opposite to the rim 102b of the top substrate 102 at the rear side (top side in FIG. 7) of the through-hole 166. A first end of the communication groove 163 communicates with the second end of the reforming flow pathway portion 162, and the second end of the communication groove 163 is joined with the air supply flow pathway portion 164 and the carbon monoxide removal flow pathway portion 165.

The air supply flow pathway portion 164 is formed to extend from the rim 102a to the rim 102c of the top substrate 102 and extends along a part of the rim 102c. A first end of the air supply flow pathway portion 164 communicates with the rim 102a of the top substrate 102, and the second end of the air supply flow pathway portion 164 communicates with the communication groove 163 and the carbon monoxide removal flow pathway portion 165.

The carbon monoxide removal flow pathway portion 165 is formed in a zigzag shape at the right side of the through-hole 166. A first end of the carbon monoxide removal flow pathway portion 165 communicates with the rim 102a of the top substrate 102, and the second end of the carbon monoxide removal flow pathway portion 165 communicates with the communication groove 163 and the air supply flow pathway portion 164.

The first end of the fuel supply flow pathway portion 161, the first end of the air supply flow pathway portion 164 and the first end of the carbon monoxide removal flow pathway portion 165 are engaged with part of the supply discharge member 151. In addition, grooves 201, 205, and 206 engaged with the supply discharge member 151 are recessed in the rim 102a of the top substrate 102.

Figure 8:
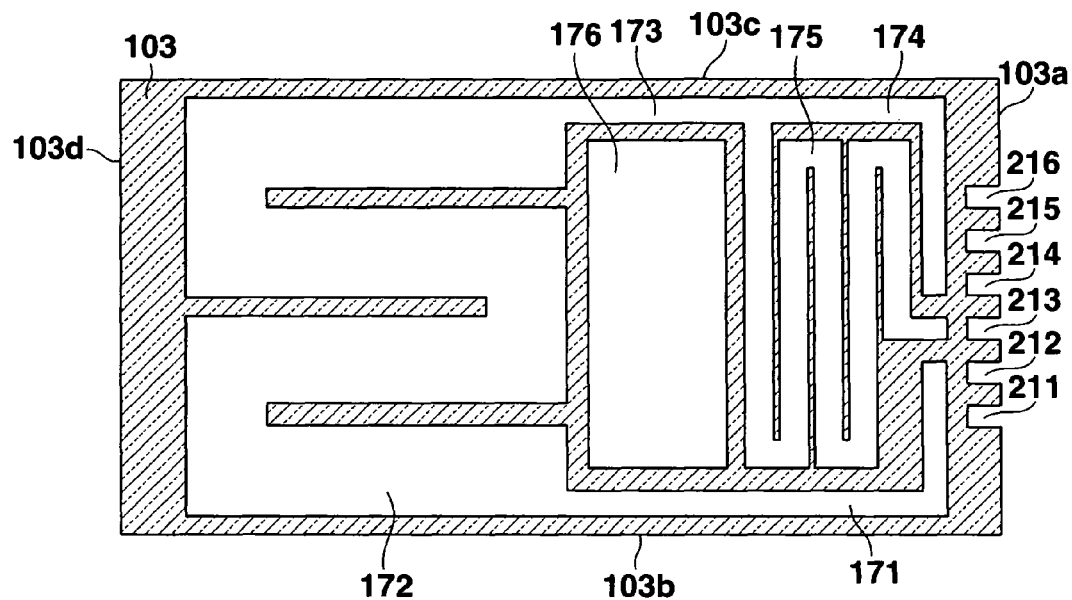
FIG. 8 is a perspective sectional view showing bottom substrate 103 on a plane taken along line VIII-VIII of FIG. 6.

FIG. 8 is an arrow-direction sectional view of the reactor 101 along line VIII-VIII of FIG. 6.

As shown in FIG. 8, in a face of the bottom substrate 103 joined with the top substrate 102, there are recessed: a fuel supply flow pathway portion 171; a reforming flow pathway portion 172 serving as a reforming reactor furnace; a communication groove 173; an air supply flow pathway portion 174; and a carbon monoxide removal flow pathway portion 175 serving as a carbon monoxide removal reactor furnace, all formed by a groove portion or a recessed portion. In addition, a rectangular though hole 176 extending through the bottom substrate 103 in a thickness direction thereof is formed at the center part of the bottom substrate 103.

The bottom substrate 103 includes: a rim 103a, a rim 103b, a rim 103c, and a rim 103d that correspond to the rim 102a, the rim 102b, the rim 102c, and the rim 102d of the top substrate 102, respectively.

With respect to a junction face between the bottom substrate 103 and the top substrate 102, the fuel supply flow pathway portion 171 and the fuel supply flow pathway portion 161 of the bottom substrate 103 and top substrate 102, respectively, are facially symmetrical to each other, except that the fuel supply flow pathway portion 171 does not reach the rim 103a of the bottom substrate 103 that corresponds to the rim 102a of the top substrate 102, whereas the fuel supply flow pathway portion 161 of the top substrate reaches the rim 102a of the top substrate as described above. Similarly, the carbon monoxide removal flow pathway portion 175 and the carbon monoxide removal flow pathway portion 165 of the bottom substrate 103 and top substrate 102, respectively, are facially symmetrical to each other, except that the carbon monoxide removal flow pathway portion 175 does not reach the rim 103a of the bottom substrate 103, whereas the first end of the carbon monoxide removal flow pathway portion 165 communicates with the rim 102a of the top substrate 102. And the air supply flow pathway portion 174 and the air supply flow pathway portion 164 of the bottom substrate 103 and top substrate 102, respectively, are facially symmetrical to each other, except that the air supply flow pathway portion 174 does not reach the rim 103a of the bottom substrate 103, whereas the first end of the air supply flow pathway portion 164 communicates with the rim 102a of the top substrate 102. The reforming flow pathway portion 172 and the reforming flow pathway portion 162, the communication groove 173 and the communication groove 163, and the through-hole 176 and the through-hole 166 are facially symmetrical to each other.

In addition, cutouts 211 to 216 engaged with the supply discharge member 151 are recessed at the rim 103a of the bottom substrate 103.

Although the fuel supply flow pathway portion 171, the air supply flow pathway portion 174, and the carbon monoxide removal flow pathway portion 175 do not reach the rim 103a of the bottom substrate 103, an end of the fuel supply flow pathway portion 171 is located in the vicinity of the cutout 212, an end of the air supply flow pathway portion 174 is located in the vicinity of the cutout 214, and an end of the carbon monoxide removal flow pathway portion 175 is located in the vicinity of the cutout 213.

A reforming catalyst (for example, a Cu/ZnO-based catalyst) is provided on a wall face of the reforming flow pathway portions 162 and 172 by being carried by a carrier, such as alumina in this embodiment; and a carbon monoxide selective oxidization catalyst (for example, platinum, ruthenium, palladium, or rhodium) is provided on a wall face of the carbon monoxide removal flow pathway portions 165 and 175 by being carried by a carrier, such as alumina in this embodiment. These catalysts can be formed in accordance with a wash coat technique after an alumina sol has been applied.

The top substrate 102 is joined with the bottom substrate 103 such that the fuel supply flow pathway portion 171 and the fuel supply flow pathway portion 161 overlap each other. Similarly, when the top substrate 102 and the bottom substrate 103 are joined: the reforming flow pathway portion 172 and the reforming flow pathway portion 162 overlap each other; the communication groove 173 and the communication groove 163 overlap each other; the air supply flow pathway portion 174 and the air supply flow pathway portion 164 overlap each other; the carbon monoxide removal flow pathway portion 175 and the carbon monoxide removal flow pathway portion 165 overlap each other; and the through-hole 176 and the through-hole 166 overlap on each other.

The top substrate 102 and the bottom substrate 103 are made of a glass material, for example. In particular, these substrates are made of a glass material containing an alkaline metal (such as Na or Li, for example) serving as a movable ion at a thermal expansion coefficient of about $33 \times 10^{-7}/°$ C.

In addition, when the top substrate 102 and the bottom substrate 103 are joined with each other by an anode junction technique, an anode junction film comprising a metal film or a silicon film is formed on one of the junction faces of the top substrate 102 and the bottom substrate 103 by a gas phase growth technique (for example a sputtering technique or a vapor deposition technique), so that the anode junction film can be bonded with oxygen atoms included in glass of the other substrate for the purpose of anode junction.

Either of the top substrate 102 and the bottom substrate 103 may be made of a metal or silicon instead of a glass material.

In addition, when the top substrate 102 has a chamfer rim 102e obtained by cutting out a corner portion between the rim 102d and the rim 102c, and an anode junction film is formed on the junction face of the bottom substrate 103, the anode junction film is partially exposed by means of the chamfer rim 102e. Accordingly, this exposed portion of the anode junction film is easily connected to an electrode terminal to which a voltage is applied at the time of anode junction. In this manner, the top substrate 102 and the bottom substrate 103 can be easily anode-joined with each other.

In the reactor 101 (which is a junction body of the top substrate 102 and the bottom substrate 103), a portion of the flow pathway formed by the reforming flow pathway portion 162 and the reforming flow pathway 172 (located at the left side of the through-holes 166 and 176) is (serves as) a reformer that carries out a reforming reaction of generating hydrogen from a mixture gas between a fuel and water. In addition, a portion of the flow pathway formed by the carbon monoxide removal flow pathway portion 165 and the carbon monoxide removal flow pathway portion 175 (located at the right side of the through-holes 166 and 176) is (serves as) a carbon monoxide remover that removes carbon monoxide included in a product generated by the reformer by preferentially oxidizing the carbon monoxide.

Figure 9:
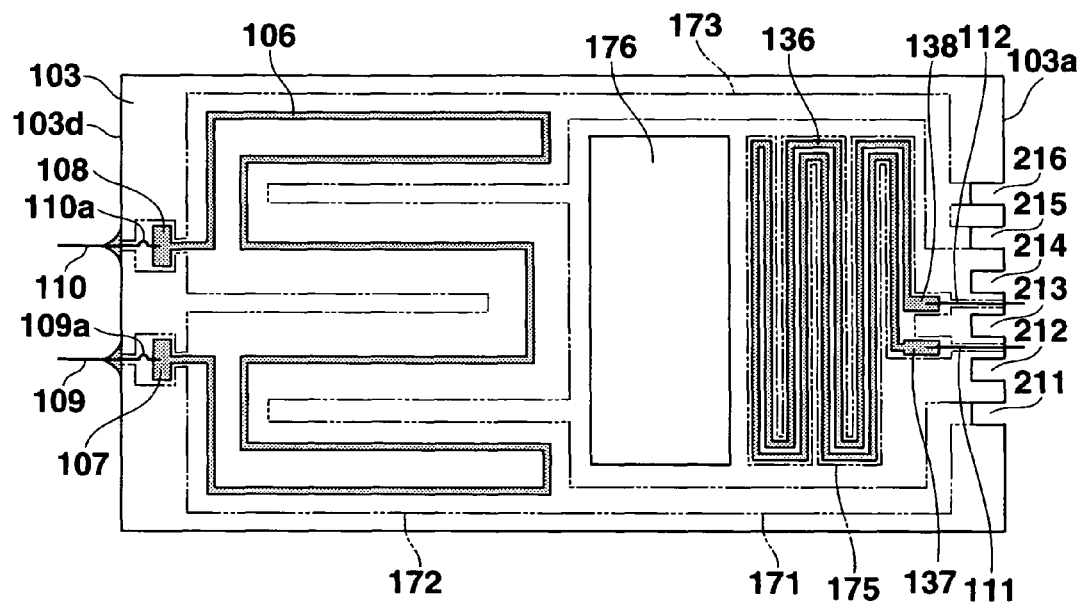
FIG. 9 is a view showing a plane taken along the line IX-IX of FIG. 6.

FIG. 9 is an arrow-direction view along line IX-IX in FIG. 6 showing a junction face of the bottom substrate 103 that is joined to the heater sealing substrate 120.

As shown in FIG. 9, on a face of the bottom substrate 103 joined with the heater sealing substrate 120 an electric heat pattern 106 and an electric heat pattern 136 are formed.

The electric heat pattern 106 overlaps the reforming flow pathway portion 172, and the electric heat pattern 136 overlaps the carbon monoxide removal flow pathway portion 175 in the view shown in FIG. 9 (along a direction perpendicular to a face on which the electric heat patterns 106 and 136 are formed).

Each of the connection terminal portions 107 and 108 at respective ends of the electric heat pattern 106 is wider than the rest of the electric heat pattern 106, and each of the connection terminal portions 137 and 138 at respective ends of the electric heat pattern 136 is wider than the rest of the electric heat pattern 136.

The connection terminal portions 107 and 108 are located in the vicinity of the rim 103d, and the connection terminal portions 137 and 138 are located in the vicinity of the rim 103a. A distance from each of the connection terminal portions 107 and 108 to the rim 103d is in the range of 2 mm to 4 mm, and a distance from each of the connection terminal portions 137 and 138 to the rim 103a is in the range of 2 mm to 4 mm, whereby the electric heat pattern 106 can be routed over a wide region of a junction face between the heater sealing substrate 120 and the bottom substrate 103.

The lead wire 109 is joined with the connection terminal portion 107; the lead wire 110 is joined with the connection terminal portion 108; the lead wire 111 is joined with the connection terminal portion 137; and the lead wire 112 is joined with the connection terminal portion 138.

For example, to perform a junction method to join the lead wires 109 to 112 with the connection terminal portions 107, 108, 137 and 138, the lead wires 109 and 110 are laid out so as to come into contact with the connection terminal portions 107 and 108; pressure is applied thereto with electrodes having an insulation material sandwiched therebetween; resistance welding is carried out by utilizing a resistance heat generated by supplying power to the lead wires 109 and 110, whereby the connection terminal portions 107 and 108 are electrically connected to the lead wires 109 and 110, respectively. In addition, the lead wires 111 and 112 are laid out so as to come into contact with the terminal portions 137 and 138, respectively, and are joined to the terminal portions 137 and 138 in a similar manner to the junction of lead wires 109 and 110 to terminal portions 107 and 108. Then, the electric heat pattern 136 and the connection terminal portions 137 and 138 are supplied with power, and then, the connection terminal portions 137 and 138 are joined so as to be electrically connected to the lead wires 111 and 112, respectively, in accordance with resistance welding for heating by such power supply.

The electric heat patterns 106 and 136 are covered with a protective insulation film except for parts of the connection terminal portions 107, 108, 137, and 138.

When forming the films which make up the electric heat patterns 106 and 136, if a stress is applied to the bottom substrate 103 at the time of forming a film, and the stress is too large, the bottom substrate 103 is distorted, which makes junction with the bottom substrate 103 difficult. Thus, it is desirable that each of the electric heat pattern 106 and the electric heat pattern 136 be formed as a thin film having a thickness that is equal to or smaller than 600 nm, including the thickness of the protective insulation film, so as to restrict a stress applied to the bottom substrate 103.

In addition, with respect to the size of each of the connection terminal portions 107 and 108, it is desirable that a length and a width be 1 mm×3 mm to facilitate junction, and with respect to the size of each of the connection terminal portions 137 and 138, it is desirable that a width and a length be 1 mm×3 mm.

When the bottom substrate 103 has electrical conductivity, such as when the bottom substrate 103 is a metal plate or the like, an insulation film is formed on the bottom substrate 103 between the surface of the substrate 103 and the lower layers of the electric heat patterns 106 and 136. This insulation film is not formed on areas where the heater sealing substrate 120 is joined to the bottom substrate 103. In addition, the thickness of the bottom substrate 103 at a position where the reforming flow pathway portion 172 has been recessed is set to about 0.2 mm to 0.3 mm.

Figure 10:
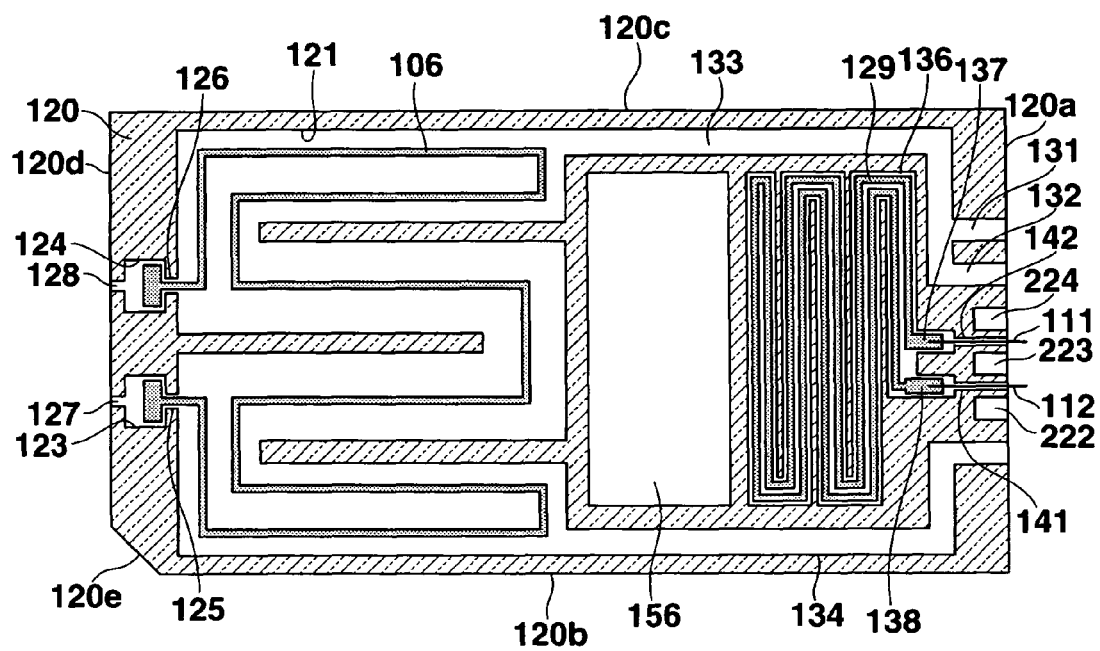
FIG. 10 is a sectional view showing a plane taken along line X-X of FIG. 6.

FIG. 10 is an arrow-direction sectional view along line X-X of FIG. 6.

As shown in FIG. 10, in a face of the heater sealing substrate 120 joined to the bottom substrate 103, there are recessed: a combustion flow pathway portion 121 serving as an electric heat pattern housing chamber which houses the electric heat pattern 106 and as a combustion reactor furnace; terminal portion housing chambers 123 and 124 that are independent of the combustion flow pathway portion 121; communication grooves 125 and 126 that couple the combustion flow pathway portion 121 to each of the terminal portion housing chambers 123 and 124; routing grooves 127 and 128 for leading out a lead wire to the outside; a heater housing groove 129 that is an electric heat pattern housing chamber for housing the electric heat pattern 136; a combustion fuel supply flow pathway portion 131; an air supply flow pathway portion 132; a communication groove 133; and a discharge gas discharge flow pathway portion 134, all formed by a groove portion or a recessed portion. In addition, a rectangular through-hole 156 extending through the heater sealing substrate 120 in a thickness direction thereof is formed at the center part of the heater sealing substrate 120. The heater sealing substrate 120 includes: a rim 120a, a rim 120b, a rim 120c, and a rim 120d that correspond to the rim 103a, the rim 103b, the rim 103c, and the rim 103d of the bottom substrate 103.

Furthermore, grooves 222, 223, and 224 engaged with the supply discharge member 151 are recessed at the rim 120a of the heater sealing substrate 120. Routing grooves 141 and 142, which communicate with the heater housing groove 129 and extend through the rim 120a of the heater sealing substrate 120 are provided at both branches of the first end of the heater housing groove 129.

It is desirable that the depth of each of the combustion flow pathway portion 121, the terminal portion housing chambers 123 and 124, the communication grooves 125 and 126, the routing grooves 127 and 128, the heater housing groove 129, the combustion fuel supply flow pathway portion 131, the air supply flow pathway portion 132, the communication groove 133, and the discharge gas discharge flow pathway portion 134 be about 5 µm.

The top substrate 102, the bottom substrate 103, and the heater sealing substrate 120 are formed in the same shape and in the same dimensions as each other. A position of the rim 102a of the top substrate 102 is aligned with a position of the rim 103a of the bottom substrate 103 and a position of the rim 120a of the heater sealing substrate 120; a position of the rim 102b of the top substrate 102 is aligned with a position of the rim 103b of the bottom substrate 103 and a position of the rim 120b of the heater sealing substrate 120; a position of the rim 102c of the top substrate 102 is aligned with a position of the rim 103c of the bottom substrate 103 and a position of the rim 120c of the heater sealing substrate 120; and a position of the rim 102d of the top substrate 102 is aligned with a position of the rim 103d of the bottom substrate 103 and a position of the rim 120d of the heater sealing substrate 120.

The discharge gas discharge flow pathway portion 134 is formed from the rim 120a to the rim 120b of the heater sealing substrate 120 along the rims 120a and 120b, and the discharge gas discharge flow pathway portion 134 extends along rim 120b as shown in FIG. 10. A second end of the discharge gas discharge flow pathway portion 134 communicates with the rim 120a of the heater sealing substrate 120, and the first end of the discharge gas discharge flow pathway portion 134 communicates with a second end of the combustion flow pathway portion 121. The combustion flow pathway portion 121 is formed in a zigzag shape at the left side of the through-hole 156.

The communication groove 133 is formed along the rim 120c to the rim 120a and extends along rim 120a of the heater sealing substrate 120 at one edge side of a peripheral rim of the through-hole 156. A second end of the communication groove 133 communicates with a first end of the combustion flow pathway portion 121; and the first end of the communication groove 133 joins with the first ends of the combustion fuel supply flow pathway portion 131 and the air supply flow pathway portion 132. The second end of the combustion fuel supply flow pathway portion 131 and the second end of the air supply fuel pathway portion 132 communicate with the rim 120a of the heater sealing substrate 120.

The terminal portion housing chambers 123 and 124 are recessed in the vicinity of the rim 120d of the heater sealing substrate 120. The terminal portion housing chambers 123 and 124 and the combustion flow pathway portion 121 are caused to communicate with each other by the communication grooves 125 and 126. The terminal portion housing chambers 123 and 124 and the rim 120d of the heater sealing substrate 120 are caused to communicate with each other by the routing grooves 127 and 128; and an end of each of the routing grooves 127 and 128 opens on a side end face of the heater sealing substrate 120.

In this way, an aggregate recessed portion of the heater sealing substrate 120 is formed by: the combustion flow pathway portion 121; the terminal portion housing chambers 123 and 124; the communication grooves 125 and 126; the routing grooves 127 and 128; the combustion fuel supply flow pathway portion 131; the air supply flow pathway portion 132; the communication groove 133; and the discharge gas discharge flow pathway portion 134.

The groove 206, the cutout 216, and the combustion fuel supply flow pathway portion 131 together serve as a combustion fuel supply port when the top substrate 102, the bottom substrate 103, and the heater sealing substrate 120 are overlapped on each other. In addition, the groove 205, the cutout 215, and the air supply flow pathway portion 132 together serve as an air supply port of the combustor when the top substrate 102, the bottom substrate 103, and the heater sealing substrate 120 are overlapped on each other. Further, the first end of the air supply flow pathway portion 164, the cutout 214, and the groove 224 together serve as an air supply port of the carbon monoxide remover when the top substrate 102, the bottom substrate 103, and the heater sealing substrate 120 are overlapped on each other. Furthermore, the first end of the carbon monoxide removal flow pathway portion 165, the cutout 213, and the groove 223 together serve as a hydrogen discharge port of the carbon monoxide remover when the top substrate 102, the bottom substrate 103, and the heater sealing substrate 120 are overlapped on each other. Still further, the first end of the fuel supply flow pathway portion 161, the cutout 212, and the groove 222 together serve as a fuel supply port of the hydrogen reformer when the top substrate 102, the bottom substrate 103, and the heater sealing substrate 120 are overlapped on each other. Moreover, the groove 201, the cutout 211, and the second end of the discharge gas discharge flow pathway portion 134 together serve as a discharge gas discharge port of the combustor when the top substrate 102, the bottom substrate 103, and the heater sealing substrate 120 are overlapped on each other.

The supply discharge member 151 includes piping portions 151a, 151b, 151c, 151d, 151e and 151f, which are inserted into the combustion fuel supply port, the air supply port of the combustor, the air supply port of the carbon monoxide remover, the hydrogen discharge port, the fuel supply port of the hydrogen reformer, and the discharge gas discharge port of the combustor, respectively. An internal diameter of the piping portions 151a, 151b, 151c, 151d, 151e, and 151f is set in the range of 0.8 mm to 1.2 mm, and an outer diameter of the piping portions in the thickness direction thereof is set in the range of 1.4 mm to 1.6 mm.

The heater housing groove 129 is formed in a zigzag shape at the right side of the through-hole 156. A second end of the heater housing groove 129 is a dead end, while the first end of the heater housing groove 129 is divided into two branches, each of which communicates with the rim 120a of the heater sealing substrate 120 via the routing grooves 141 and 142.

With respect to a junction face of the heater sealing substrate 120 with the reactor 101, the combustion flow pathway portion 121 and the reforming flow pathway portion 172 are substantially facially symmetrical to each other, and the heater housing groove 129 and the carbon monoxide removal flow pathway portion 175 are substantially facially symmetrical to each other.

A combustion catalyst (for example, platinum) is provided on a wall face of the combustion flow pathway portion 121 by, for example, being carried by a carrier such as alumina.

The heater sealing substrate 120 is also made of a glass material containing an alkaline metal (such as Na or Li, for example) serving as a movable ion, in particular.

In addition, the heater sealing substrate 120 and the bottom substrate 103 are joined with each other by an anode junction technique. Thus, on a junction face of either of the heater sealing substrate 120 and the bottom substrate 103, a metal film or a silicon film is formed by a gas phase growth technique (for example, a sputtering technique or a vapor deposition technique).

When Pyrex (registered trademark) glass is used as a material for the heater sealing substrate 120, the top substrate 102, and the bottom substrate 103, a thermal expansion coefficient thereof is set to $33 \times 10^{-7}/°$ C. When the heater sealing substrate 120 has a chamfer rim 120e obtained by cutting out a corner portion between the rim 120d and the rim 120b and an anode junction film is formed on a junction face of the bottom substrate 103, the anode junction film is partially exposed by means of the chamfer rim 120e. Accordingly, this exposed portion of the anode junction film is easily connected to an electrode terminal to which a voltage is applied at the time of anode junction.

When the bottom substrate 103 and the heater sealing substrate 120 are joined with each other, the electric heat pattern 106 is housed in the combustion flow pathway portion 121 and the communication grooves 125 and 126, the connection terminal portion 107 is housed in the terminal portion housing chamber 123, the connection terminal portion 108 is housed in the terminal portion housing chamber 124, and the lead wires 109 and 110 are engaged with the routing grooves 127 and 128. In addition, when the bottom substrate 103 and the heater sealing substrate 120 are joined with each other, the electric heat pattern 136 is housed in the heater housing groove 129, and the lead wires 111 and 112 are engaged in the first end of the heater housing groove 129 via the routing grooves 142 and 141.

Figure 11:
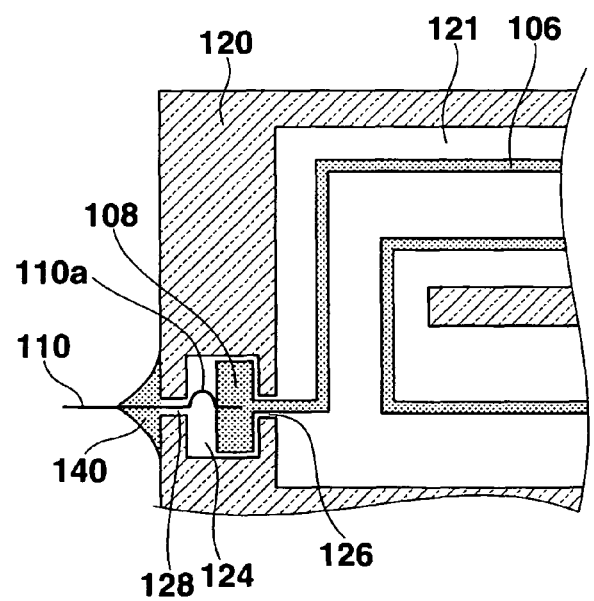
FIG. 11 is an enlarged view showing the periphery of a connection terminal portion 108 in the cross section of FIG. 10.

FIG. 11 is an enlarged view showing the periphery of the connection terminal portion 108 in the cross section of FIG. 10.

As shown in FIG. 11, the lead wire 110 has a bending portion 110a that slackens in an arc shape in the terminal portion housing chamber 124. The lead wire 109 also has such a bending portion that slackens in a arc shape in the terminal portion housing chamber 123. In this way, the lead wires 109 and 110 slacken so as to be flexibly bent in a direction different from a longitudinal direction of the lead wires 109 and 110, whereby a length of each of the lead wires 109 and 110 from the connection terminal portions 107 and 108 to the rims 103d and 120d from which the lead wires 109 and 110 are lead out is in the range of 1.1 times to 5.0 times, and preferably 1.5 times, as long as a linear distance from the connection terminal portions 107 and 108 to the rims 103d and 120d.

In addition, as shown in FIG. 11, a sealing agent 140 is provided at the periphery of the lead wire 110 in an opening of the routing groove 128, whereby the opening of the routing groove 128 is closed by the sealing agent 140 and a gap between the lead wire 110 and the routing groove 128 is sealed by the sealing agent 140. Similarly, a sealing agent is provided at the periphery of the lead wire 109 in the opening of the routing groove 127, whereby the opening of the routing groove 127 is closed by the sealing agent and a gap between the lead wire 109 and the routing groove 127 is sealed by the sealing agent. Thus, the combustion flow pathway portion 121 is closed at the openings of the routing grooves 127 and 128, so that a fluid in the combustion flow pathway portion 121 does not leak from the routing grooves 127 and 128. It is preferable that the sealing agent have an expansion coefficient approximate to an expansion coefficient of a material for either of the bottom substrate 103 and the heater sealing substrate 120. If the bottom substrate 103 and the heater sealing substrate 120 both are formed of a glass material, it is preferable that a low melting point glass sealing agent be used. If the bottom substrate 103 and the heater sealing substrate 120 are formed of a metal, the metal may be used as a brazing material.

A sealing agent may also be provided at peripheries of the lead wires 111 and 112, which are connected to the connection terminal portions 137 and 138, so as to seal openings of the routing grooves 141 and 142 by the sealing agent. If the sealing agent is provided in routing grooves 141 and 142, then in a similar manner to lead wires 109 and 110, it is preferable that the lead wires 111 and 112 each have a bending portion that slackens so as to be flexibly bent in a direction different from a longitudinal direction of the lead wires 111 and 112 in the heater housing groove 129. With this structure, a length of each of the lead wires 111 and 112 from of the connection terminal portions 137 and 138 to the rims 103a and 120a from which the lead wires 111 and 112 are lead out is in the range of 1.1 times to 5.0 times, and preferably 1.5 times, as long as a linear distance from each of the connection terminal portions 137 and 138 to the rims 103a and 120a. If the bending portion is located in a sealing site where the sealing agent is present (i.e., if the bending portion is covered with the sealing agent), the bending portion is hardly effective at dispersing stress. Accordingly, it is preferable to provide the bending portion at a site other than the sealing site.

Figure 12:
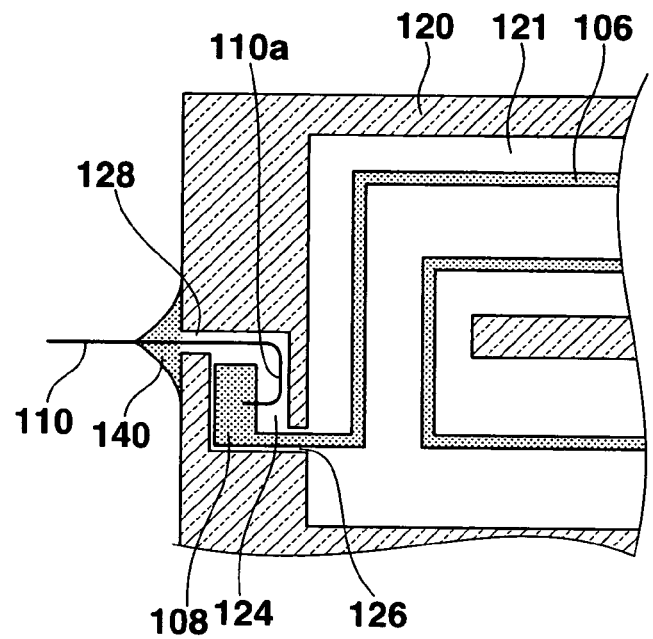
FIGS. 12 and 13 each show a modified example of the periphery of the connection terminal portion 108 shown in FIG. 11.
Figure 13:
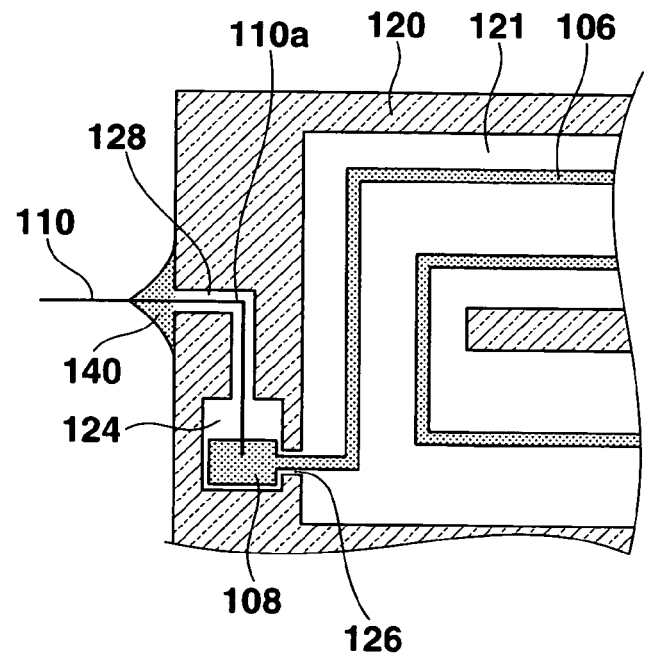

FIGS. 12 and 13 each show a modified example of the periphery of the connection terminal portion 108 shown in FIG. 11.

The shape of the terminal portion housing chamber 124, the routing groove 128, and the communication groove 126 may be shaped as shown in FIGS. 12 or 13 instead of as shown in FIG. 11. In FIG. 12, the routing groove 128 and the communication groove 126 communicate with each other across a diagonal of the terminal portion housing chamber 124. The lead wire 110 has a bending portion 110a that slackens while it is bent at two locations to have a U shape. In FIG. 13, the routing groove 128 is formed in an L shape, and has a bending portion 110a such that the lead wire 110 slackens while it is bent in an L shape in the routing groove 128. With the structure shown in FIGS. 12 and 13, the routing groove 128 and the communication groove 126 are not located across from each other on a straight line as shown in FIG. 11. The terminal portion housing chamber 123, the routing groove 127, and the communication groove 125 may be formed in the same shapes as those of the terminal portion housing chamber 124, the routing groove 128, and the communication groove 126 shown in FIGS. 12 and 13.

In addition, each of the lead wires 111 and 112 may have a bending portion that slackens while it is bent at two locations to have a U shape, in the same way as the shape shown in FIG. 12. And each of the routing grooves 142 and 141 may have a bent shape, and the lead wires 111 and 112 may have a bending portion that slackens while bent in the routing grooves 142 and 141 (for example, as shown in FIG. 13).

If, for example, the lead wires 109 and 110 are formed to be linear without a bending portion, and each of the lead wires 109 and 110 is a kovar line having a thermal expansion coefficient of about $50 \times 10^{-7}/°C.$, and if the sealing agent is a low melting point glass sealing agent having a thermal expansion coefficient of about $33 \times 10^{-7}/°C.$, when a reaction is caused in the composite microscopic reactor device 100 by heating it at about 300° C., a stress due to thermal expansion of the lead wires 109 and 110 is greater than a stress due to thermal expansion of the low melting point glass sealing agent. Thus, distortion of the stress concentrates on the sealing sites where the sealing agent covers the lead wires 109 and 110, and a deviation (detachment) of the lead wires 109 and 110 from the sealing agent occurs. By contrast, when the configuration as shown in FIG. 11, 12 or 13 is provided, the lead wires 109 and 110 each have a bending portion, and thus, the thermal stress is dispersed. Therefore, the lead wires 109 and 110 do not slip out of the sealing agent even if they are heated up to 350° C. In addition, the lead wires 109 and 110 may have a plurality of bending portions. The bottom substrate 103 is thin (has a small thickness) at a portion thereof at which the reforming flow pathway portion 172 is provided, and as shown in FIG. 8, for example, the reforming flow pathway portion 172 is wider than the carbon monoxide removal flow pathway portion 175. Thus, strength of the bottom substrate 103 against an external stress is weak. Therefore, if the connection terminal portions 107 and 108 are laid out on a back face of the reforming flow pathway portion 172, the bottom substrate 103 may be broken or deformed by pressure produced at the time of resistance welding (which is performed to connect the lead wires 109 and 110 to the connection terminal portions 107 and 108). In order to prevent such breakage or deformation, the connection terminal potions 107 and 108 are laid out at a back face portion of the bottom substrate 103 located outside the reforming flow pathway portion 172, as shown in FIG. 9, for example. Specifically, the connection terminal portions are arranged at positions that correspond to the terminal portion housing chambers 123 and 124 of the heater sealing substrate 120 which is joined with the back face of the bottom substrate 103.

A portion of the bottom substrate 103 that corresponds to the terminal portion housing chambers 123 and 124 is sufficiently thick so that the bottom substrate 103 can be prevented from being broken or deformed by the pressure produced at the time of resistance welding.

If the terminal portion housing chambers 123 and 124 are excessively increased in size, a distance from the reforming flow pathway portion 172 to the rim 103d increases, whereby a flow pathway of the reforming flow pathway portion 172 is reduced. Alternatively, if the terminal portion housing chambers 123 and 124 are excessively reduced in size, the connection terminal portions 107 and 108 are reduced in size, such that the connection terminal portions 107 and 108 are hardly welded to the lead wires 109 and 110. In view of these competing limitations, the size of the terminal portions 107 and 108 is set to 1 mm×3 mm, and a distance from the reforming flow pathway portion 172 to the rim 103d is set in the range of 2 mm to 4 mm.

Next, a method for manufacturing the composite microscopic reactor device 100 will be described.

First, the top substrate 102, bottom substrate 103, and heater sealing substrate 120 are prepared, and then, a metal film or a silicon film is formed on junction faces of the substrates by a gas phase growth technique, as necessary. For example, in the example described above the metal or silicon film may be formed on the junction faces of the bottom substrate 103, for coupling the bottom substrate 103 to the top substrate 102 and the heater sealing substrate 120.

Next, an electric heat film is formed on a bottom (back) face of the bottom substrate 103 and the electric heat film is shaped by a photolithography etching technique to pattern electric heat patterns 106 and 136. The electric heat patterns 106 and 136 are coated with an insulation film, such that the insulation film does not cover or only partially covers connection terminal portions 107, 108, 137, and 138.

Next, the fuel supply flow pathway portion 161, the reforming flow pathway portion 162, the communication groove 163, the air supply flow pathway portion 164, and the carbon monoxide removal flow pathway portion 165, each of which is a groove portion or a recessed portion, as well as the through-hole 166 and grooves 201, 205, and 206 are formed in the top substrate 102. In addition, the fuel supply flow pathway portion 171, the reforming flow pathway portion 172, the communication groove 173, the air supply flow pathway portion 174, and the carbon monoxide removal flow pathway portion 175, each of which is a groove portion or a recessed portion, as well as the through-hole 176 and cutouts 211 to 216 are formed in the bottom substrate 103. Still further, the combustion flow pathway portion 121, terminal portion housing chambers 123 and 124, communication grooves 125 and 126, routing grooves 127 and 128, the heater housing groove 129, the combustion fuel supply flow pathway portion 131, the air supply flow pathway portion 132, the communication groove 133, the discharge gas discharge flow pathway portion 134, routing grooves 141 and 142, grooves 222, 223, and 224, and a through-hole 156 are formed in the heater sealing substrate 120.

Next, alumina sol is applied to the reforming flow pathway portion 162 and the reforming flow pathway portion 172, and further, a reforming catalyst is applied by a wash coat technique to be carried by the alumina on the reforming flow pathway portions 162 and 172. In addition, alumina sol is applied to the carbon monoxide removal flow pathway portion 165 and the carbon monoxide removal flow pathway portion 175, and a carbon monoxide removal catalyst is applied by a wash coat technique to be carried by the alumina on the carbon monoxide removal flow pathway portions 165 and 175. Still further, alumina sol is applied to the combustion flow pathway portion 121, and a combustion catalyst is applied by a wash coat technique to be carried by the alumina on the combustion flow pathway portion 121.

Next, the top substrate 102 and the bottom substrate 103 are joined with each other by an anode junction technique, which is described above.

Next, the lead wire 109, which has a bending portion, is joined with the connection terminal portion 107 by resistance welding (described above); a lead wire 110, which has a bending portion, is joined with the connection terminal portion 108 by resistance welding; a lead wire 111 is joined with the connection terminal portion 137 by resistance welding; and a lead wire 112 is joined with the connection terminal portion 138 by resistance welding.

Next, the bottom substrate 103 and the heater sealing substrate 120 are adhered to each other; the bottom substrate 103 and the heater sealing substrate 120 are aligned with each other; and the electric heat patterns 106 and 136 are covered with the heater sealing substrate 120. The heater sealing substrate 120 is joined with the bottom substrate 103 in accordance with an anode junction technique. When the heater sealing substrate is joined with the bottom substrate 103, the electric heat pattern 106 is housed in the combustion flow pathway portion 121 and the communication grooves 125 and 126; the connection terminal portion 107 is housed in the terminal portion housing chamber 123; the connection terminal portion 108 is housed in the terminal portion housing chamber 124; the lead wires 109 and 110 are engaged with the routing grooves 127 and 128; the electric heat pattern 136 is housed in the heater housing groove 129; and the lead wires 111 and 112 are engaged with the routing grooves 142 and 141 that communicate with the heater housing groove 129. In addition, the heater sealing substrate 120 is joined with the bottom substrate 103 in accordance with an anode junction technique.

Next, a sealing agent is injected into the routing grooves 127 and 128, thereby sealing openings of the routing grooves 127 and 128. A sealing agent may also be injected into the routing grooves 141 and 142, in which case the lead wires 111 and 112 each have a bending portion.

Next, the supply discharge member 151 is engaged with the ports on a right end face of a junction body of the top substrate 102, the bottom substrate 103, and the heater sealing substrate 120 described above (such as the discharge gas discharge port of the combustor formed by the overlapping ends of the groove 201, the cutout 211, and the second end of the discharge gas discharge flow pathway portion 134). Through the supply discharge member 151 and the ports on the right end face of the junction body: a fuel supply flow pathway for supplying a reforming fuel gas is connected to the fuel supply flow pathway portion 161; one suction flow pathway for supplying air is connected to the air supply flow pathway portion 164; another suction flow pathway for supplying air is connected to the air supply flow pathway portion 132; a combustion gas supply flow pathway for supplying a combustion gas is connected to the combustion fuel supply flow pathway portion 131; a generated-gas discharge flow pathway for discharging a generated gas is connected to the carbon monoxide removal flow pathway portion 165; and a discharge gas discharge flow pathway for discharging a combustion discharge gas is connected to the discharge gas discharge flow pathway portion 134.

Next, a heat insulation package 150 is prepared, and an infrared ray reflection film is formed on an internal face of the heat insulation package 150. Then, in a manufacturing apparatus furnace having an atmosphere whose pressure has been reduced to 10 Pa or less, preferably 1 Pa or less, the junction body of the top substrate 102, the bottom substrate 103, and the heater sealing substrate 120 is housed in the heat insulation package 150; the supply discharge member 151 is routed out from the heat insulation package 150; and then, the lead wires 109, 110, 111, and 112 are routed out from the heat insulation package 150. Then, portions of the supply discharge member 151 and the lead wires 109, 110, 111, and 112 that are routed through the heat insulation package are sealed with the heat insulation package by a sealing agent, and then, the atmosphere in the heat insulation package 150 is pressure-reduced to 10 Pa or less, and desirably, 1 Pa or less.

In the composite microscopic reactor device 100 in the present embodiment, when a voltage is applied between the lead wires 109 and 110, the electric heat pattern 106 is heated, and when a voltage is applied between the lead wires 111 and 112, the electric heat pattern 136 is heated. At this time, when a combustion gas (for example, hydrogen gas, methanol gas, ethanol gas, or dimethyl ether gas) is fed to the combustion fuel supply flow pathway portion 131, and then, an air (oxygen) is fed to the air supply flow pathway portion 132, a mixture gas of the combustion gas and the air flows through the combustion flow pathway portion 121. The combustion gas is combusted by means of the combustion catalyst; and a combustion heat is generated. In addition, if a mixture gas of a fuel (for example, methanol, ethanol, or dimethyl ether) and water is supplied to the fuel supply flow pathway portions 161 and 171, the mixture gas is reacted by means of a reforming catalyst to produce a hydrogen gas while the mixture gas flows through the reforming flow pathway portions 162 and 172; and a small amount of a carbon monoxide gas is also produced (refer to formulas (1) and (2) described previously in the case where the fuel is methanol). When an air is supplied to the air supply flow pathway portion 164, the mixture of air and all or part of the products of the reforming reaction flows through the carbon monoxide removal flow pathway portion 165 in a state in which hydrogen gas, carbon monoxide gas, the air and the like have been mixed with each other. At this time, a selective oxidizing reaction of preferentially oxidizing carbon monoxide gas in accordance with a carbon monoxide removal catalyst takes place, so as to remove carbon monoxide gas from the products of the hydrogen reforming reaction. Then, a gas including hydrogen gas or the like is discharged from the carbon monoxide removal flow pathway portion 165.

A mixture gas of a fuel (for example, methanol, ethanol, or dimethyl ether) and air (oxygen) may be supplied to the fuel supply flow pathway portion 161. In this case the fuel causes a partial oxidation reforming reaction, so as to produce hydrogen gas is produced. In that case, the catalyst carried onto the wall faces of each of the reforming flow pathway portions 162 and 172 is a partial oxidation reforming catalyst. In addition, two types of catalysts may be carried onto the reforming flow pathway portions 162 and 172, and a partial oxidation reforming reaction and a vapor reforming reaction (formula (1) above) may be used in combination.

Next, an example of a use of the composite microscopic reactor device according to the present invention will be described.

Figure 14:
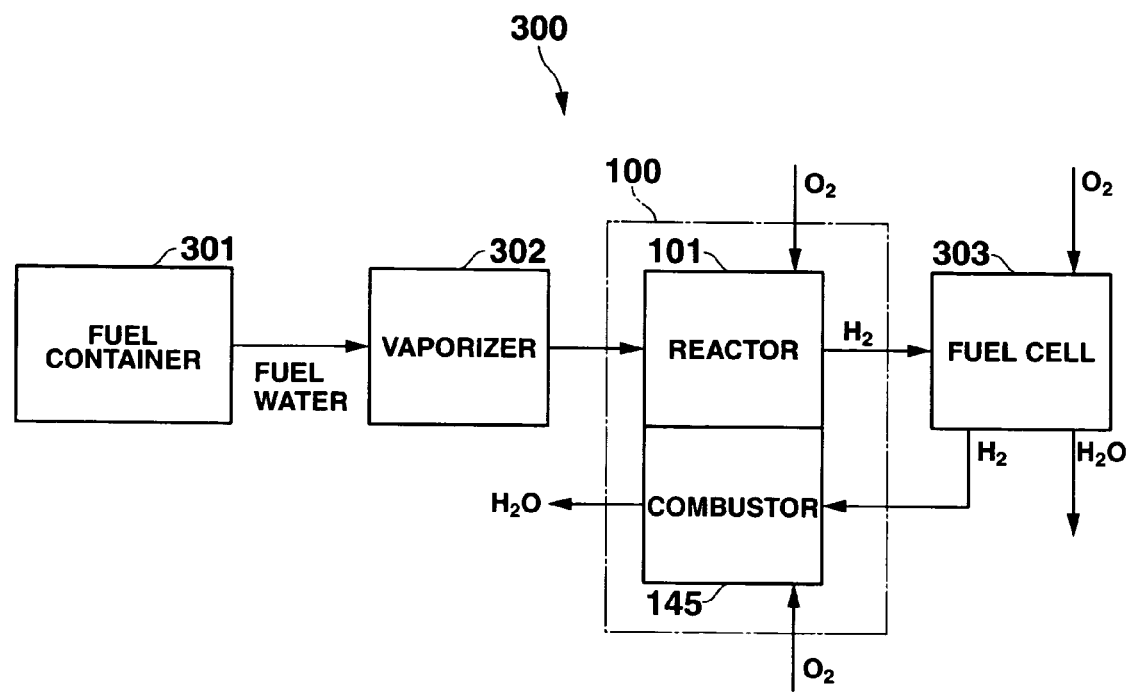
FIG. 14 is a block diagram depicting a configuration of an electric power generator to which the composite microscopic reactor device of the second embodiment is applied.

FIG. 14 is a block diagram depicting a configuration of an electric power generator to which the composite microscopic reactor device in the present invention is applied.

The composite microscopic reactor device 100 in the present invention can be used for an electric power generator 300 as shown in FIG. 14. This electric power generator 300 includes: a fuel package 301 storing a fuel and water in a liquid state; a vaporizer 302 for vaporizing the fuel and water supplied from the fuel package 301; a composite microscopic reactor device 100; and a fuel cell 303 for generating electric energy by means of hydrogen gas supplied from the reactor 101 of the composite microscopic reactor device 100. The fuel and water vaporized by the vaporizer 302 flow into the fuel supply flow pathway portions 161 and 171. The hydrogen gas or the like which flows from the carbon monoxide removal flow pathway portions 165 and 175, after the carbon monoxide is removed from the products of the hydrogen reforming reaction of the fuel and water, is supplied to a fuel electrode of the fuel cell 303. Air is supplied to an oxygen electrode of the fuel cell 303, and electric energy is produced by means of an electrochemical reaction in the fuel cell 303. Here, the hydrogen gas supplied to the fuel electrode of the fuel cell 303 may not be wholly reacted in the fuel cell 303. When hydrogen gas remains after the electrochemical reaction in the fuel cell 303, the remaining hydrogen gas may be supplied to the combustion fuel supply flow pathway portion 131 (combustor 145).

According to the second embodiment, the electric heat pattern 106 is formed on the bottom face of the bottom substrate 103, the electric heat pattern 106 is housed in the combustion flow pathway portion 121 of the heater sealing substrate 120, which is joined with the bottom substrate 103, and the routing grooves 127 and 128 are sealed. Thus, the heat generated from the electric heat pattern 106 is accumulated in the combustion flow pathway portion 121. Accordingly, the heat generated from the electric heat pattern 106 is efficiently used for a reforming reaction of the fuel in the reforming flow pathway portions 162 and 172 or for combustion of the combustion gas in the combustion flow pathway portion 121.

In addition, since according to the second embodiment the electric heat pattern 106 is housed in the combustion flow pathway portion 121 and the communication grooves 125 and 126 of the heater sealing substrate 120, the intimacy of contact between the heater sealing substrate 120 and the bottom substrate 103. Moreover, according to the second embodiment the routing grooves 127 and 128 each communicate with (open at) a rim of the heater sealing substrate 120 (although they are sealed with the sealing agent), and the lead wires 109 and 110 communicate with the routing grooves 127 and 128, so that the intimacy of contact between the heater sealing substrate 120 and the bottom substrate 103 is not lowered by the lead wires 109 and 110. Similarly, part of the lead wires 111 and 112 and the electric heat pattern 136 are housed in the heater housing groove 129, thereby enhancing the intimacy of contact between the bottom substrate 103 and the heater sealing substrate 120. In this way, the intimacy of contact between the heater sealing substrate 120 and the bottom substrate 103 is high, so that the heat of the electric heat pattern 106 or the combustion gas in the combustion flow pathway portion 121 does not leak.

Still further, the opening at the end of each of the routing grooves 127 and 128 is sealed by a sealing agent, so as to prevent the heat generated by the electric heat pattern 106 and the combustion in the combustion flow pathway portion 121 from being released, such that heat is efficiently used for the fuel reforming reaction in the reforming flow pathway portions 162 and 172. Sealing the opening at the end of each of the routing grooves 127 and 128 also prevents the combustion gas supplied to the combustion flow pathway portion 121 from leaking from the openings. The heat of the electric heat pattern 106 is also utilized for catalytic combustion of the combustion gas in the combustion flow pathway portion 121. In particular, the electric heat pattern 106 is exposed inside the combustion flow pathway portion 121, so that the electric heat of the electric heat pattern 106 can be efficiently used for catalytic combustion of the combustion gas.

According to the second embodiment, moreover, the openings of the heater housing groove through which the lead wires 111 and 112 are routed are not necessarily sealed with a sealing agent. When the openings of the heater housing groove 129 at the rim of the heater sealing substrate 120 are not closed by a sealing agent, even if the gas in the heater housing groove 129 expands or contracts due to a temperature change, there are no extreme changes in the air pressure in the heater housing groove 129. With this structure, the serving life of the heater sealing substrate 120 and the bottom substrate 103 can be extended.

While a reforming flow pathway and a carbon monoxide removal flow pathway portion have been formed in both of the top substrate 102 and the bottom substrate 103 in the second embodiment described above, the reforming flow pathway portion and the carbon monoxide removal flow pathway portion may be formed only in the top substrate 102, or alternatively, the reforming flow pathway portion and the carbon monoxide removal flow pathway portion may be formed only in the bottom substrate 103.

In addition, while according to the second embodiment as described above the electric heat patterns 106 and 136 are both mounted on the bottom surface of the bottom substrate 103 in positions corresponding to the reforming flow pathway portion 172 and the carbon monoxide removal flow pathway portion 175, and are housed by the heater sealing substrate 120, one of the electric heat patterns 106 and 136 may be provided on either of the top substrate 102 and the bottom substrate 103. In this case, on one or the other of the top substrate 102 and the bottom substrate 103, there are provided: a terminal portion housing chamber provided independently of a reforming flow pathway portion and corresponding to the terminal portion housing chambers 123 and 124; a communication groove corresponding to each of the communication grooves 125 and 126 and leading an electric heat pattern in the reforming flow pathway portion to a terminal portion housed in the terminal portion housing chamber; and a routing groove corresponding to each of the routing grooves 127 and 128. In particular, in the case where a strength against an external stress is significantly weakened by means of a reforming flow pathway portion, the reforming flow pathway portion may be formed on only one of the top substrate 102 and the bottom substrate 103, and then, an electric heat pattern may be formed on only the other one.

Third Embodiment

Now, a third embodiment of the reactor device according to the present invention will be described.

Figure 15:
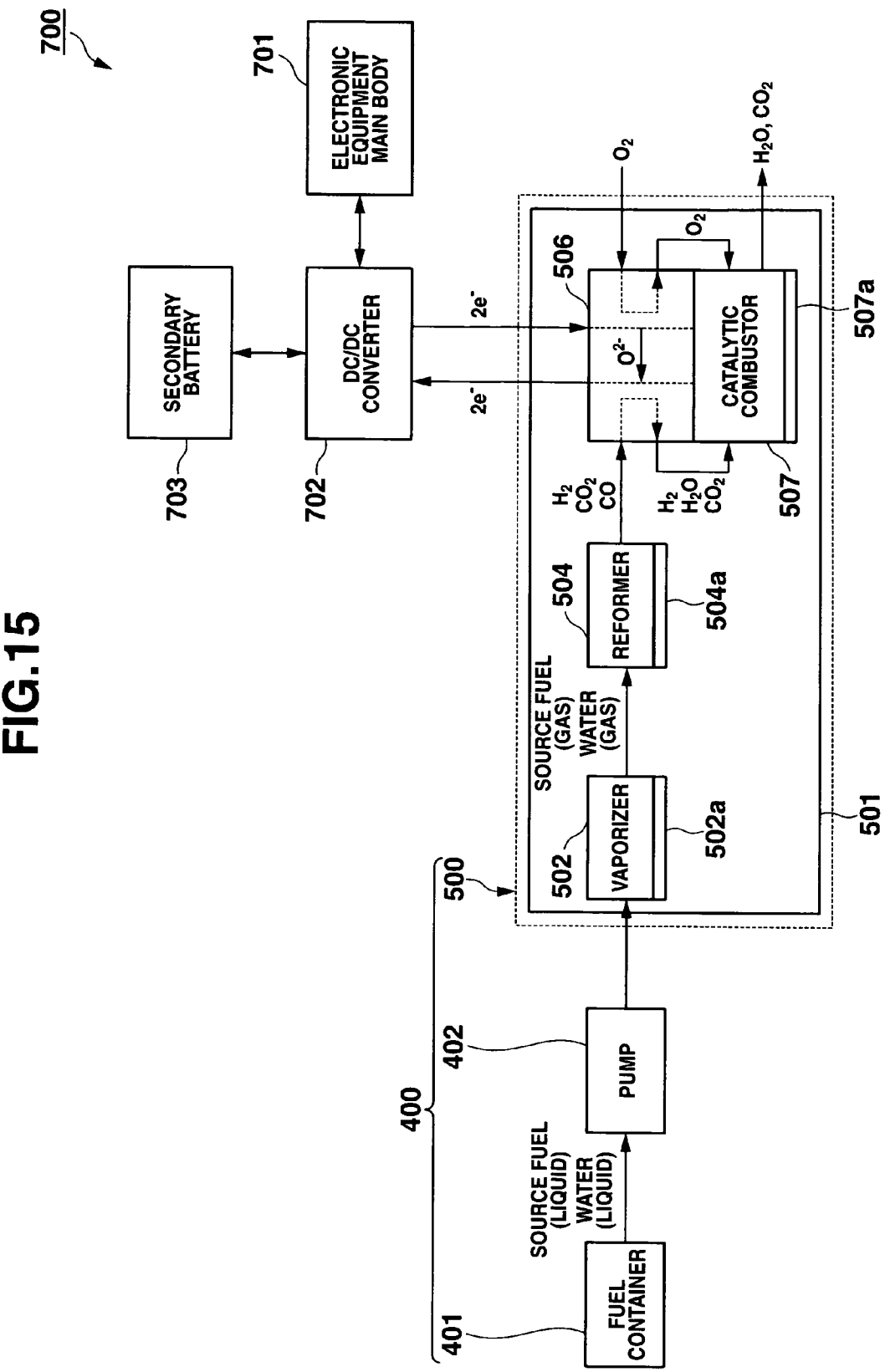
FIG. 15 is a block diagram depicting a configuration of electronic equipment to which a third embodiment of the reactor device according to the present invention is applied.

FIG. 15 is a block diagram depicting a configuration of electronic equipment 700 using the reactor device of the third embodiment of the present invention.

Electronic equipment 700 is, for example, portable electronic equipment such as a notebook type personal computer, a PDA, an electronic notebook, a digital camera, a cellular phone, a wristwatch, a register, or a projector.

Electronic equipment 700 is equipped with an electric power generator 400 including a reactor device 500, a fuel container 401, a pump 402 and the like. The fuel container 401 of the electric power generator 400 is, for example, removably provided on the electronic equipment 700, and the pump 402 and the reactor device 500 are, for example, incorporated in a main body of the electronic equipment 700. The reactor device 500 includes a box-shaped heat insulation package 501, and a vaporizer 502, a reformer 504, an electric power generation cell 506, and a catalytic combustor 507 housed in the heat insulation package 501. The atmospheric pressure in the heat insulation package 501 is maintained to be reduced to 10 Pa or less, and desirably, 1 Pa or less.

A mixture of a liquid source fuel (for example, methanol, ethanol, or dimethyl ether) and water is stored in the fuel container 401. The liquid source fuel and the water may be stored in separate containers. The pump 402 suctions the liquid mixture from the fuel container 401 and feeds the liquid to the vaporizer 502 in the reactor device 500.

Electric heater-compatible temperature sensors 502a, 504a, and 507a are provided at the vaporizer 502, the reformer 504, and the catalytic combustor 507, respectively. Each of the electric heater-compatible temperature sensors 502a, 504a and 507a is a resistance heater, and the electric heater-compatible temperature sensors 502a, 504a and 507a are operable to heat the vaporizer 502, the reformer 504, and the catalytic combustor 507, respectively. In addition, electric resistance values of the electric heater-compatible temperature sensors 502a, 504a, and 507a depend on a temperature thereof, such that electric heater-compatible temperature sensors 502a, 504a, and 507a also function as temperature sensors for measuring temperatures of the vaporizer 502, the reformer 504, and the catalytic combustor 507, respectively.

The liquid mixture fed from the pump 402 to the vaporizer 502 is heated to about 110° C. to 160° C. by the heat of both the electric heater-compatible temperature sensor 502a and the catalytic combustor 507, and vaporizes. The gas mixture vaporized by the vaporizer 502 is fed to the reformer 504.

A flow pathway is formed inside the reformer 504, and a catalyst is carried onto a wall face of the flow pathway. The gas mixture fed from the vaporizer 502 to the reformer 504 flows through the flow pathway of the reformer 504, and the gas mixture in the flow pathway of the reformer 504 is heated to about 300° C. to 400° C. by the heat of both the electric heater-compatible temperature sensor 504a and the catalytic combustor 507, whereby a fuel reforming reaction is caused by means of a catalyst. In accordance with a catalytic reaction of the source fuel and water, a gas mixture (reformed gas) of hydrogen and carbon dioxide, serving as a fuel, and a trace amount of carbon monoxide that is a by-product of the reforming reaction is generated by means of the reactions set forth in formulas (1) and (2) described above. The generated reformed gas is delivered to the electric power generation cell 506.

Figure 16:
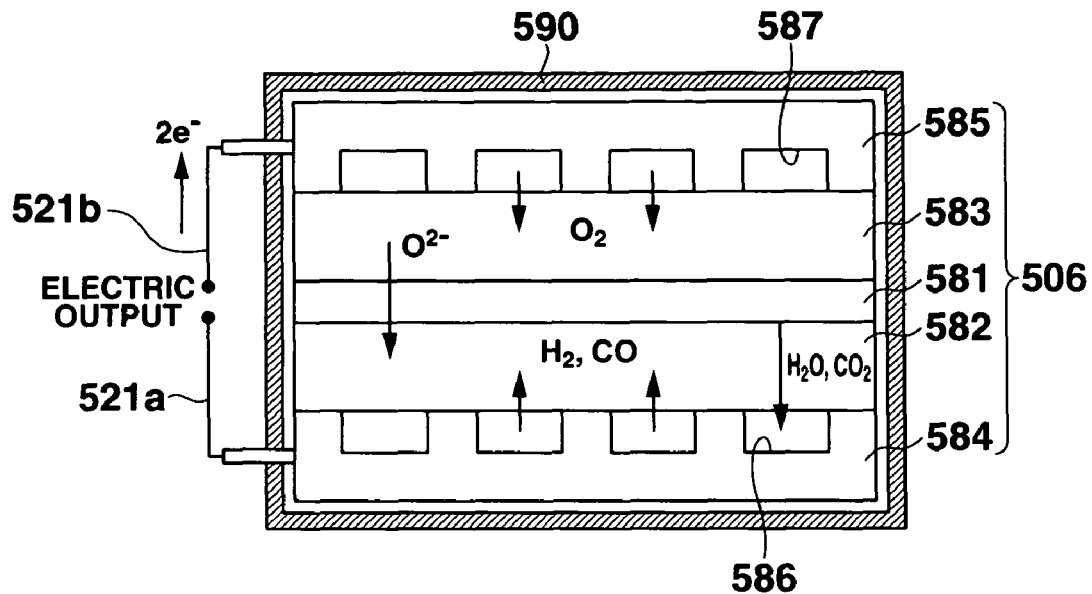
FIG. 16 is a schematic view showing an electric power generation cell in the reactor device according to the third embodiment.

As shown in FIG. 16, the electric power generation cell 506 includes: a solid oxide electrolyte 581; a fuel electrode 582 (anode) and an oxygen electrode 583 (cathode) formed on respective faces of the solid oxide electrolyte 581; an anode collector electrode 584 joined with the fuel electrode 582 and having a flow pathway 586 formed in a junction face thereof; and a cathode collector electrode 585 joined with the oxygen electrode 583 and having a flow pathway 587 formed in a junction face thereof. The electric power generation cell 506 is housed in a cabinet 590.

Zirconia-based $(Zr_{1-x}Y_x)O_{2-x/2}$(YSZ), a lanthanum gallate-based $(La_{1-x}Sr_x)(Ga_{1-y-x}Mg_yCo_z)O_3$ or the like can be used for the solid oxide electrolyte 581; $La_{0.84}Sr_{0.16}MnO_3$, La(Ni, Bi)O$_3$, (La, Sr)MnO$_3$, $In_2O_3+SnO_2$, LaCoO$_3$ or the like can be used for the fuel electrode 582; Ni, Ni+YSZ or the like can be used for the oxygen electrode 583; and LaCr(Mg)O$_3$, (La, Sr)CrO$_3$, NiAl+Al$_2$O$_3$ or the like can be used for the anode collector electrode 584 and the cathode collector electrode 585.

The electric power generation cell 506 is heated to about 500° C. to 1000° C. by means of the heat of both the electric heater-compatible temperature sensor 507a and the catalytic combustor 507, and a reaction described later occurs.

Air is fed to the oxygen electrode 583 via the flow pathway 587 of the cathode collector electrode 585. At the oxygen electrode 583, oxygen ions are generated by oxygen and electrons supplied from a cathode output electrode 521b, as shown in formula (5) below.

$$O_2 + 4e^- \rightarrow 2O^{2-} \quad (5)$$

The solid oxide electrolyte 581 is permeable to oxygen ions, and the oxygen ions generated at the oxygen electrode 583 are permeated through the solid oxide electrolyte 581 to arrive at the fuel electrode 582.

The reformed gas discharged from the reformer 504 is fed to the fuel electrode 582 via the flow pathway 586 of the anode collector electrode 584. The reactions shown in formulas (6) and (7) below occur at the fuel electrode 582, between the oxygen ions that have permeated the solid oxide electrolyte 581 and the reformed gas. The electrons discharged from the fuel electrode 582 are supplied via the cathode output electrode 521b to the oxygen electrode 583 through an external circuit such as an anode output electrode 521a or to a DC/DC converter 702.

$$H_2 + O^{2-} \rightarrow H_2O + 2e^- \quad (6)$$

$$CO + O^{2-} \rightarrow CO_2 + 2e^- \quad (7)$$

The anode output electrode 521a and the cathode output electrode 521b are connected to the anode collector electrode 584 and the cathode collector electrode 585, respectively and are routed and drawn through the cabinet 590. Here, as described later, the cabinet 590 is formed of a Ni-based alloy, for example, and the anode output electrode 521a and the cathode output electrode 521b are insulated and drawn from the cabinet 590 by means of an insulation material such as glass or ceramics. As shown in FIG. 15, the anode output electrode 521a and the cathode output electrode 521b each are connected to the DC/DC converter 702, for example.

Figure 17:
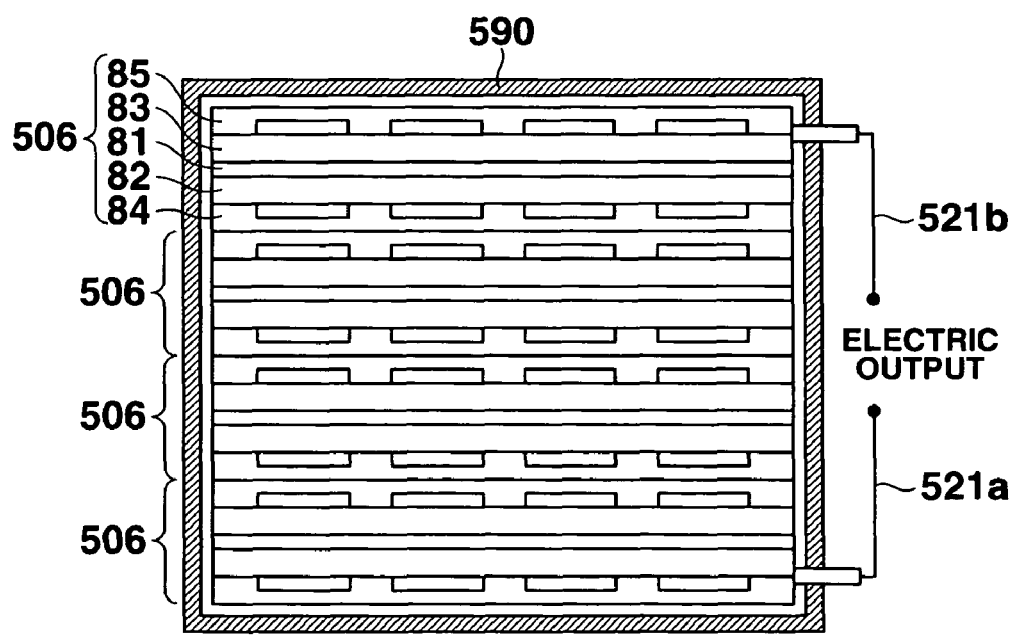
FIG. 17 is a schematic view showing an example of an electric power generation cell stack of the reactor device according to the third embodiment.

As shown in FIG. 17, a plurality of electric power generation cells 506, each including an anode collector electrode 584, a fuel electrode 582, a solid oxide electrolyte 581, an oxygen electrode 583, and a cathode collector electrode 585, may be connected in series as a cell stack. In this case, as shown in FIG. 17, the anode connector electrode 584 of the electric power generation cell 506 at one end of the stack is connected to the anode output electrode 521a, and the cathode collector electrode 585 of the electric power generation cell 506 at the other end of the stack is connected to the cathode output electrode 521b. In this case, the cell stack is housed in the cabinet 590.

The DC/DC converter 702 converts the electric energy generated by means of the electric power generation cell 506 to a proper voltage, and then supplies the converted voltage to an electric equipment main body 701. The DC/DC converter 702 may also charge a secondary battery 703 with the electric energy generated by means of the electric power generation cell 506. The electric energy stored in the secondary battery 703 is supplied to the electronic equipment main body 701 when the DC/DC converter 702 charges the secondary battery 703, and when the electric power generation cell 506 does not operate.

Unreacted hydrogen is included in the reformed gas that has passed through the flow pathway of the anode collector electrode 584 ("off" gas). The off gas is supplied to the catalytic combustor 507 together with air that has passed through the flow pathway 587 of the cathode collector electrode 585. A flow pathway is formed inside the catalytic combustor 507, and a Pt-based catalyst is carried onto a wall face of the flow pathway.

A gas mixture (combustion gas) of the off gas and the air from the electric power generation cell 506 flows through the flow pathway of the catalytic combustor 507, and the combustion gas is heated by means of the electric heater-compatible temperature sensor 507a. In the combustion gas that flows through the flow pathway of the catalytic combustor 507, hydrogen is combusted by means of the catalyst, whereby combustion heat is generated. The discharge gas after combustion is discharged from the catalytic combustor 507 to the outside of the heat insulation package 501.

The combustion heat generated by the catalytic combustor 507 is used to maintain a temperature of the electric power generation cell 506 at a high temperature (about 500° C. to 1000° C., as described above). Then, the heat of the electric power generation cell 506 is transmitted to the reformer 504 and the vaporizer 502, and is used for the vaporization in the vaporizer 502 and the reforming reaction in the reformer 504.

Now, a specific configuration of the reactor device 500 will be described.

Figure 18:
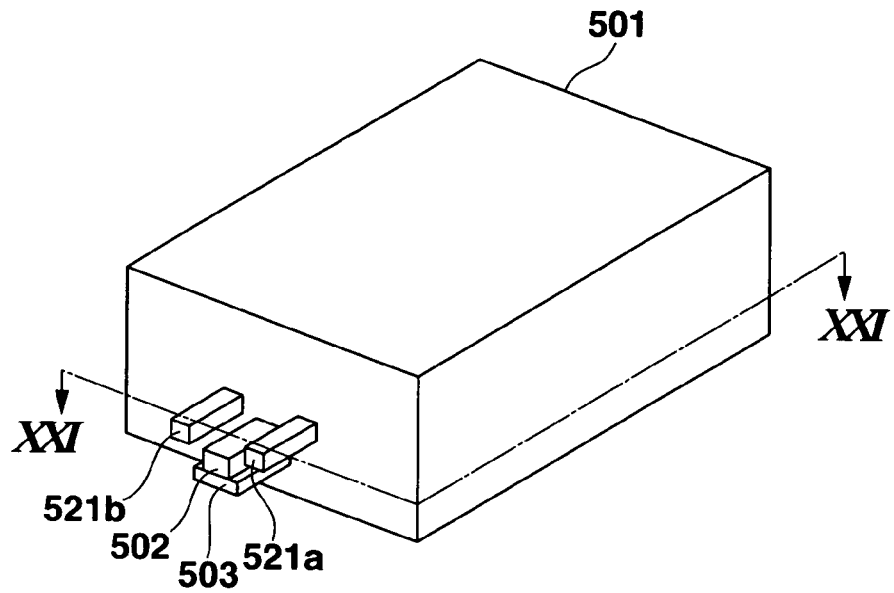
FIG. 18 is a perspective view showing a heat insulation package of the reactor device according to the third embodiment.

As shown in FIG. 18, an inlet of a vaporizer 502, a connecting portion 503, an anode output electrode 521a, and a cathode output electrode 521b protrude from one wall face of the heat insulation package 501.

Figure 19:
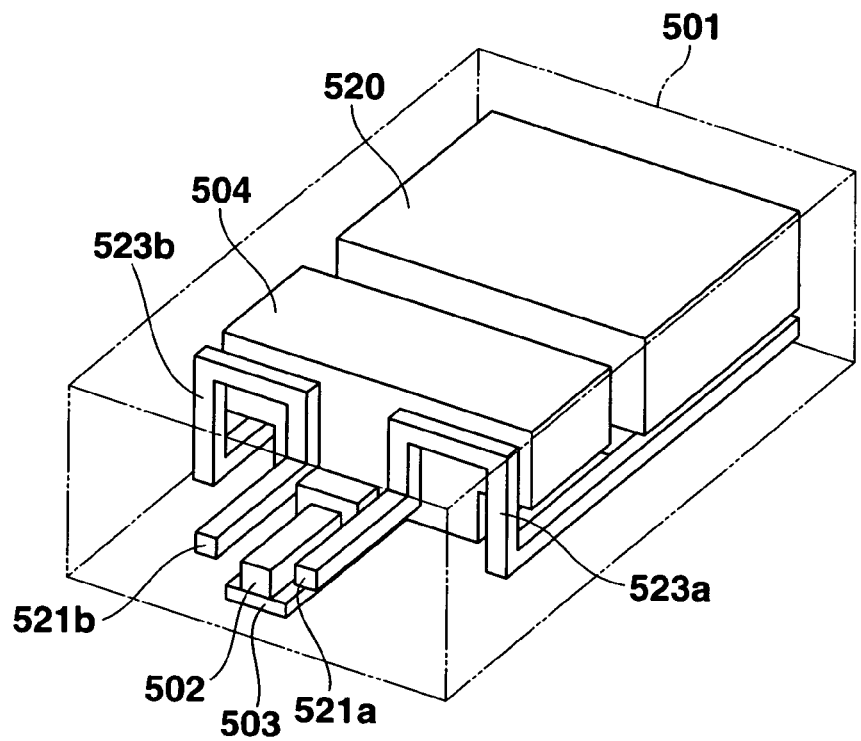
FIG. 19 is a perspective view showing an internal structure of the heat insulation package of the reactor device according to the third embodiment.
Figure 20:
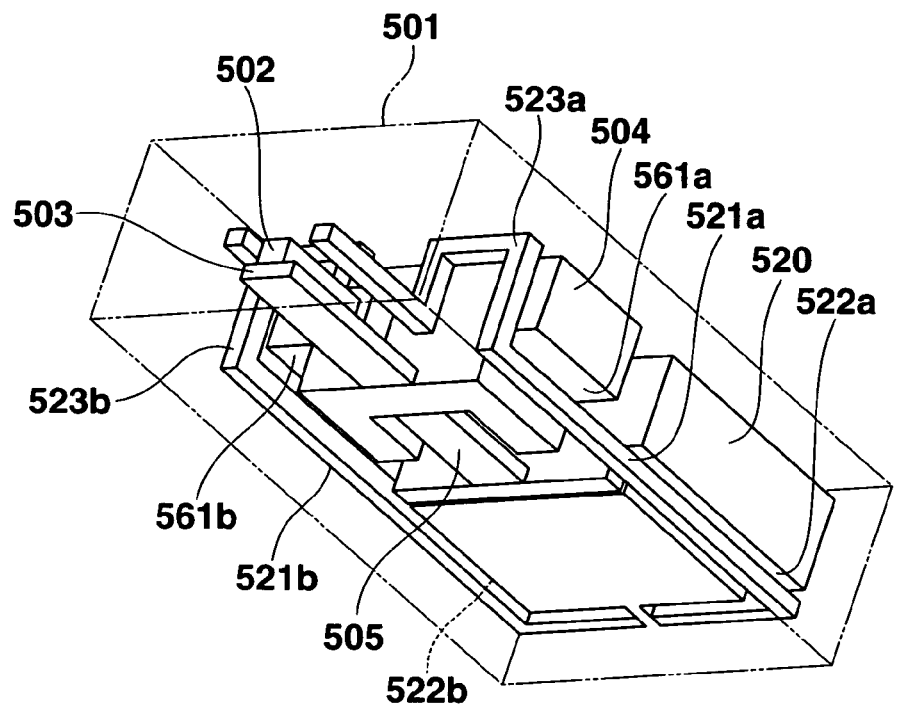
FIG. 20 is a perspective view of the internal structure of the heat insulation package of FIG. 19 as seen from below.
Figure 21:
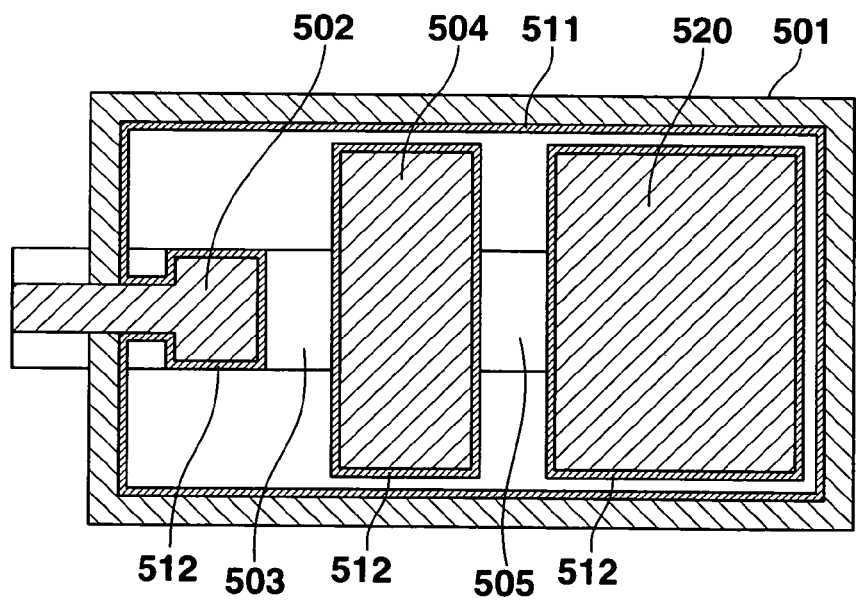
FIG. 21 is an arrow-directing cross section taken along the line XXI-XXI of FIG. 18.

As shown in FIGS. 19 to 21, the vaporizer 502, the reformer 504, and a fuel cell portion 520 are arranged in this order in the heat insulation package 501. The connecting portion 503 extends between the vaporizer 502/outside of the package and the reformer 504, and a connecting portion 505 extends between the reformer 504 and the fuel cell portion 520. The fuel cell portion 520 includes the electric power generation cell and the catalytic combustor 507, which are formed integrally with each other, and the cabinet 590 which houses the electric power generation cell 506 and the catalytic combustor 507. The vaporizer 502 passes through the heat insulation package 501 together with the connecting portion 503, and the vaporizer 502 and the reformer 504 are connected to each other by the connecting portion 503. The reformer 504 and the fuel cell portion 520 are connected to each other by the connecting portion 505. The vaporizer 502, the connecting portion 503, the reformer 504, the connecting portion 505, the cabinet 590 housing the electric power generation cells 506 of the fuel cell portion 520, and the combustor 507 are made of a metal having high temperature durability and proper heat conductivity, and, for example, can be formed by using an Ni-based alloy such as inconel 783, for example. It is preferable to ensure that these portions are formed of the same material in order to reduce a stress generated among the vaporizer 502, the connecting portion 503, the reformer 504, the connecting portion 505, the cabinet 590 of the fuel cell portion 520, and the catalytic combustor 507, with a temperature increase.

It is preferable to ensure that the anode output electrode 521a, the cathode output electrode 521b, and the cabinet 590 are formed of the same material so as to prevent damage to the anode output electrode 521a and the cathode output electrode 521b (which are connected to the anode collector electrode 584 and the cathode collector electrode 585, respectively, and are extracted from the cabinet 590), due to stress caused by a difference in thermal expansion ratios when a temperature of the electric power generation cell 506 rises.

An irradiation proof film 511 is formed on an internal wall face of the heat insulation package 501, and an irradiation proof film 512 is formed on an external wall face of each of the vaporizer 502, the connecting portion 503, the reformer 504, the connecting portion 505, and the fuel cell portion 520. The irradiation proof films 511 and 512 each prevent heat transmission due to irradiation, and, for example, are made of Au or Ag and the like. It is preferable to provide at least one of the irradiation proof films 511 and 512, and it is more preferable to provide both of these films.

As shown in FIGS. 19 and 20, the vaporizer 502, the connecting portion 503, the reformer 504, the connecting portion 505, and the fuel cell portion 520 are coupled with each other; and bottom faces of the connecting portion 503, the reformer 504, the connecting portion 505, and the fuel cell portion 520 are aligned.

Figure 22:
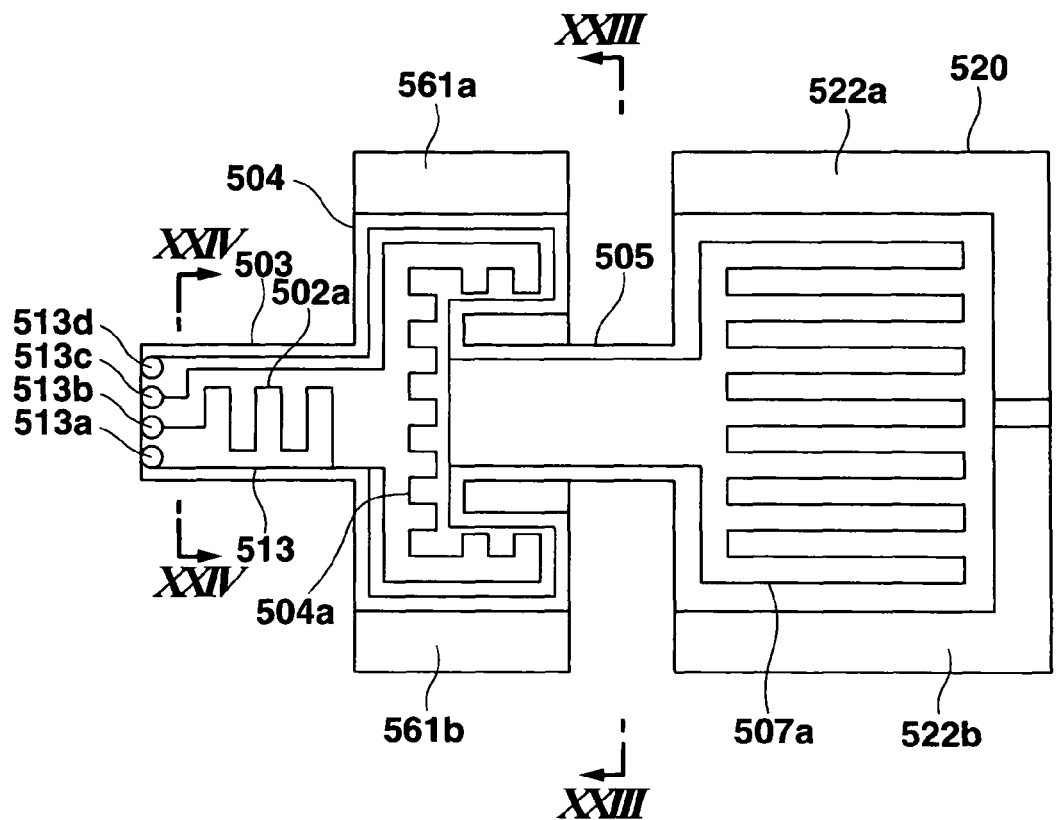
FIG. 22 shows bottom faces of a connection portion, a reformer, and a fuel cell portion in the reactor device according to the third embodiment.
Figure 23:
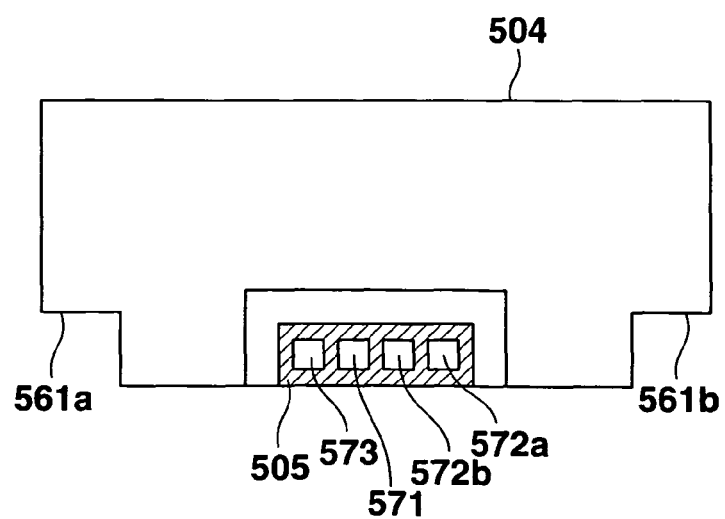
FIG. 23 is a sectional view taken along line XXIII-XXIII of FIG. 22.
Figure 24:
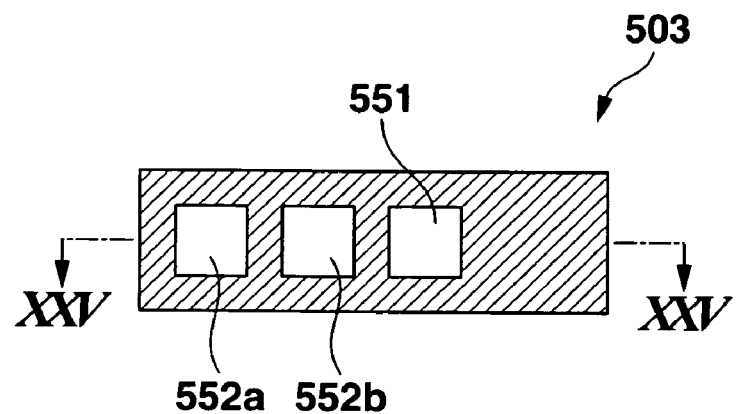
FIG. 24 is a sectional view taken along line XXIV-XXIV of FIG. 22.
Figure 25:
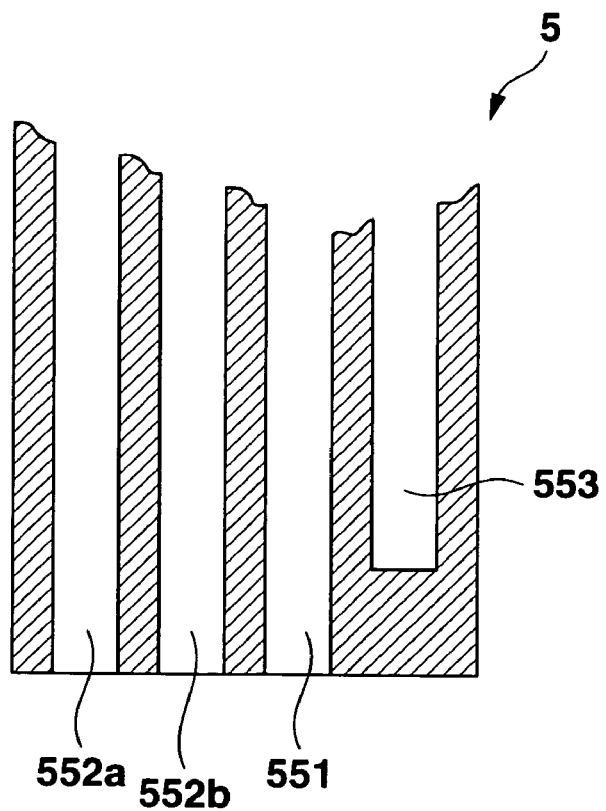
FIG. 25 is a sectional view taken along line XXV-XXV of FIG. 24.

As shown in FIGS. 22 and 23 (which omit the anode output electrode 521a and the cathode output electrode 521b), recessed portions 561a, 561b, 522a, and 522b, in which the anode output electrode 521a and the cathode output electrode 521b are arranged, are formed at a lower outer rim part of the reformer 504 (recessed portions 561a and 561b) and the fuel cell portion 520 (recessed portions 522a and 522b).

In addition, sites to be connected to the connecting portion 505 of the reformer 504 are retracted with respect to a face opposite to the fuel cell portion 520. Thus, while the connecting portion 505 is increased in length, and heat transmission from the fuel cell portion 520 to the reformer 504 is reduced, a distance between the fuel cell portion 520 and the reformer 504 is reduced, thereby making it possible to downsize equipment.

As shown in FIG. 22, after insulation processing has been applied to the bottom faces of the connecting portion 503, the reformer 504, the connecting portion 505, and the fuel cell portion 520 by means of ceramics or the like, a wiring pattern 513 is formed on a bottom face of each of the connecting portion 503, the reformer 504, the connecting portion 505, and the fuel cell portion 520. The wiring pattern 513 is formed in a zigzag and forms the electric heater-compatible temperature sensors 502a, 504a, and 507a at the lower parts of the vaporizer 502, reformer 504 and fuel cell portion 520. A first end of each of the electric heater-compatible temperature sensors 502a, 504a, and 507a is connected to a common terminal 513a, and respective second ends of the electric heater-compatible temperature sensors 502a, 504a, and 507a are connected to three separate terminals 513b, 513c, and 513d, respectively. The four terminals 513a, 513b, 513c, and 513d are formed at an end of the connecting portion 503 that is outside of the heat insulation package 501.

The connection portions 503 and 505 include: supply flow pathways 551 and 571 for supplying air to the oxygen electrode 583 of the electric power generation cell 506; and discharge flow pathways 552a, 552b, 572a, and 572b for discharging the discharge gas discharged from the catalytic combustor 507. In addition, the connecting portion 503 includes a supply flow pathway 553 for supplying the vaporized fuel gas from the vaporizer 502 to the reformer 504. Still further, the connecting portion 505 includes a supply flow pathway 573 for supplying the reformed gas from the reformer 504 to the fuel electrode 582 of the electric power generation cell 506.

Thus, as shown in FIG. 23, four flow pathways 571, 572a, 572b, and 573 are provided inside the connecting portion 505. However, in order to sufficiently increase a diameter of a flow pathway of the discharge gas discharged from the catalytic combustor 507 with respect to the off gas and air supplied to the catalytic combustor 507, two of the four flow pathways, namely flow pathways 572a and 572b, are used as discharge gas flow pathways for the discharge gas.

The anode output electrode 521a and the cathode output electrode 521b are connected to positions through which there increases a distance relevant to a wall face on which the anode output electrode 521a and the cathode output electrode 521b of the heat insulation package 501 are routed from the connecting portion 505 of the fuel cell portion 520, and preferably, are connected and drawn to an end opposite to the connecting portion 505. The anode output electrode 521a is drawn from the anode collector electrode 584 and the cathode output electrode 521b is drawn from the cathode collector electrode 585. The anode output electrode 521a and the cathode output electrode 521b are arranged along the recessed portions 561a, 561b, 522a, and 522b of the fuel cell portion 520 and the reformer 504. As shown in FIGS. 19 and 20, the anode output electrode 521a and the cathode output electrode 521b are bent at four positions of respective bending portions 523a and 523b thereof, which are located in a space between an internal wall face of the heat insulation package 501 and the reformer 504, and protrude to outside from the same wall face of the heat insulation package 501 from which an inlet of the vaporizer 502 and the connecting portion 503 protrude.

The bending portions 523a and 523b serve as a stress relaxation structure between the fuel cell portion 520 and the heat insulation package 501 to avoid damage from stress due to deformation of the anode output electrode 521a and the cathode output electrode 521b.

Figure 26:
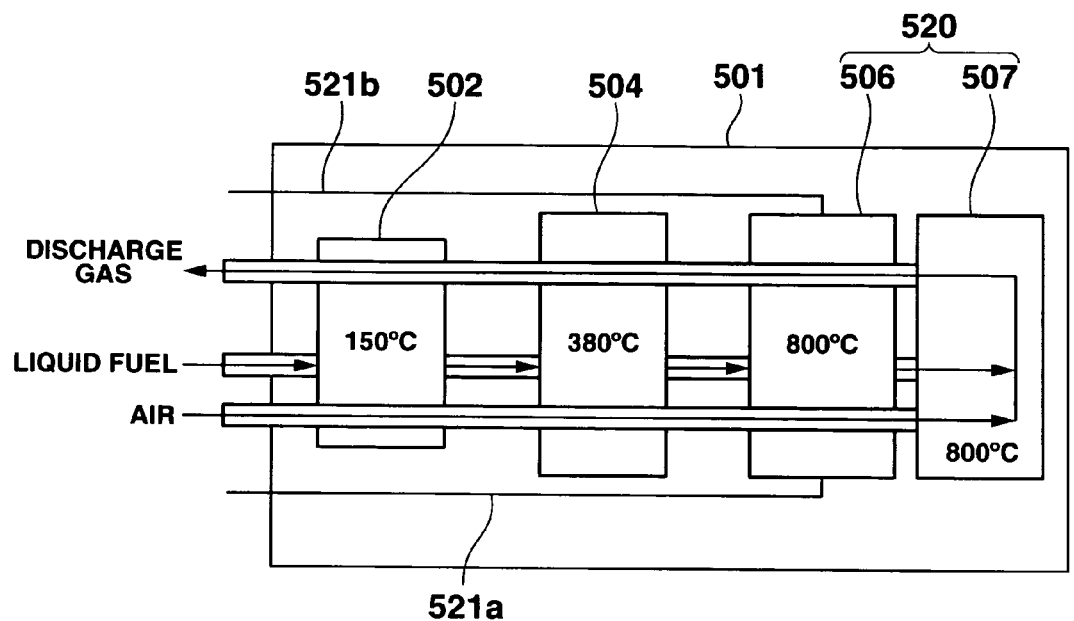
FIG. 26 is a schematic view showing a temperature distribution at the time of normal operation in the heat insulation package of the reactor device according to the third embodiment.

As shown in FIG. 26, which shows a temperature distribution during normal operation of the reactor device according to the third embodiment, when the fuel cell portion 520 is maintained at about 800° C., for example, heat is transferred from the fuel cell portion 520 to the reformer 504 via the connecting portion 505 and from the reformer 504 to the outside of the vaporizer 502 and to outside of the heat insulation package 501 via the connecting portion 503. As a result, the reformer 504 is maintained at about 380° C., and the vaporizer 502 is maintained at about 150° C. In addition, the heat of the fuel cell portion 520 is transferred to the outside of the heat insulation package 501 via the anode output electrode 521a and the cathode output electrode 521b as well. Thus, after a fuel cell portion 520 has been started up, the output electrodes 521a and 521b expand due to an increase in temperature.

Figure 27:
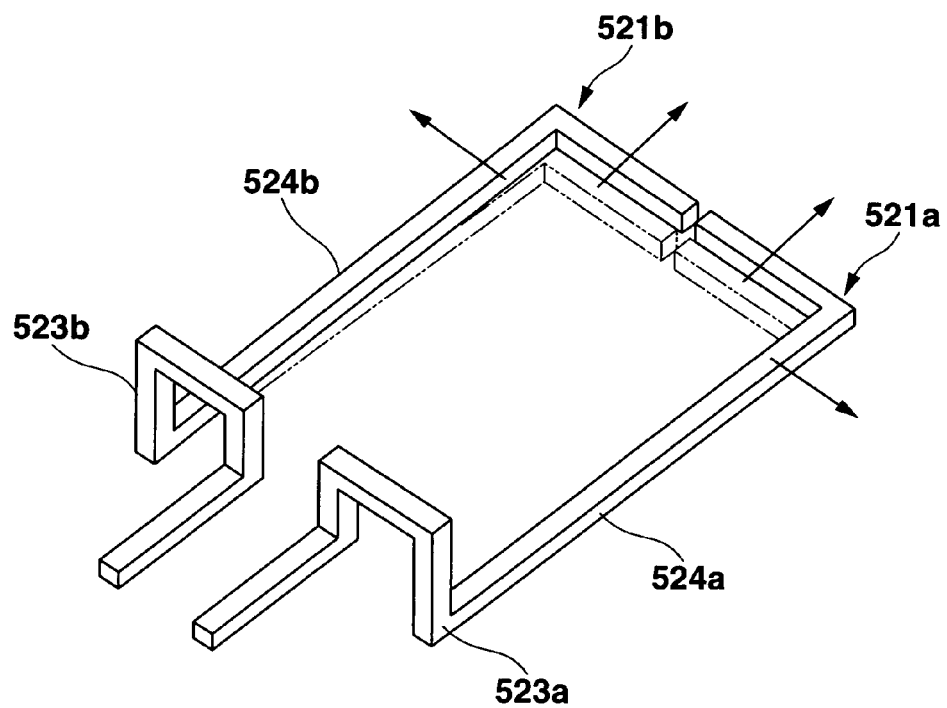
FIG. 27 is a simulation chart showing a modification due to a temperature increase of an anode output electrode and a cathode output electrode in the reactor device according to the third embodiment.

As shown in FIG. 27, which is a simulation chart showing deformation of the anode output electrode and the cathode output electrode according to the third embodiment due to a temperature increase, the anode output electrode 521a and the cathode electrode 521b expand due to a temperature increase of the fuel cell portion 520, such that the output electrodes are deformed to the shape indicated by the solid line in FIG. 27 from the shape indicated by the double dotted chain line in FIG. 27.

At this time, portions 524a and 524b of the anode output electrode 521a and the cathode electrode 521b at the side of the fuel cell portion 520 are higher in temperature, and thus expand more significantly, than bending portions 523a and 523b. As described above, first ends of the anode output electrode 521a and the cathode output electrode 521b are connected to the anode collector electrode 584 and the cathode collector electrode 585, respectively, of the fuel cell portion 520, and second ends of the anode output electrode 521a and the cathode output electrode 521b are joined with and protrude from a wall face of the heat insulation package 501 at the side of the heat insulation package 501 where the vaporizer 502 is positioned. Accordingly, the expansion of the anode and cathode output electrodes 521a and 521b the anode output electrode 521a and the cathode output electrode 521b to stress. However, since the anode output electrode 521a and the cathode output electrode 521b have bending portions 523a and 523b, respectively the deformation due to the expansion can be absorbed by the bending portions 523a and 523b, and stress acting between the heat insulation package 501 and the fuel cell portion 520 can be relaxed.

The bending portions 523a and 523b also serve to increase a heat transmission pathway of the anode output electrode 521a and the cathode output electrode 521b. Therefore, a thermal loss of heat from the fuel cell portion 520 to the heat insulation package 501 through the anode output electrode 521a and the cathode output electrode 521b can be reduced.

MODIFIED EXAMPLE

Each of FIGS. 28, 29, 30, and 31 shows a modification to the internal structure in the heat insulation package in a reactor device according to the third embodiment.

Figure 28:
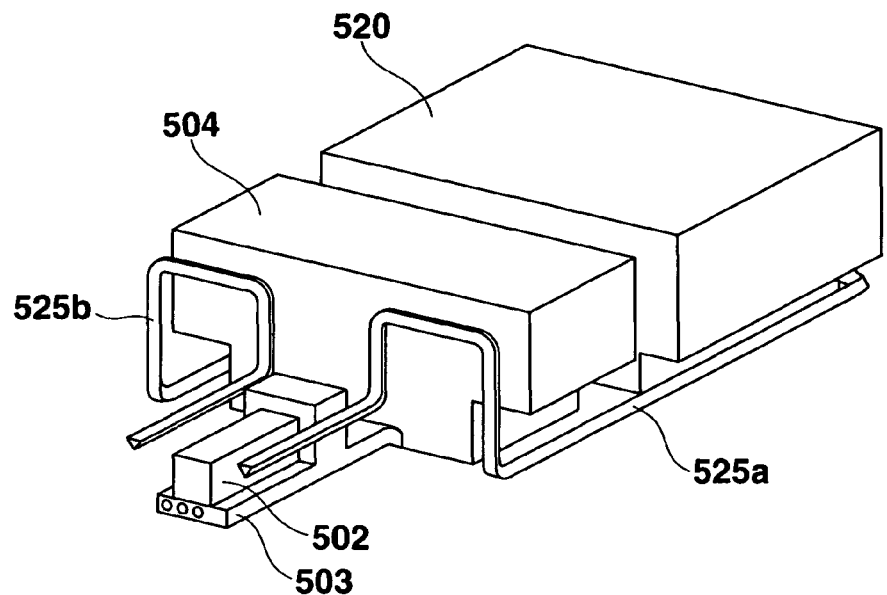
FIGS. 28, 29, 30, and 31 are perspective views each showing a modified example of the internal structure of the heat insulation package of the reactor device according to the third embodiment.

First, the anode output electrode and cathode output electrode may have a triangular cross-section, in the manner of anode output electrode 525a and cathode output electrode 525b shown in FIG. 28, instead of the square cross sectional shape of the anode output electrode 521a and the cathode output electrode 521b used in the third embodiment described above.

Figure 29:
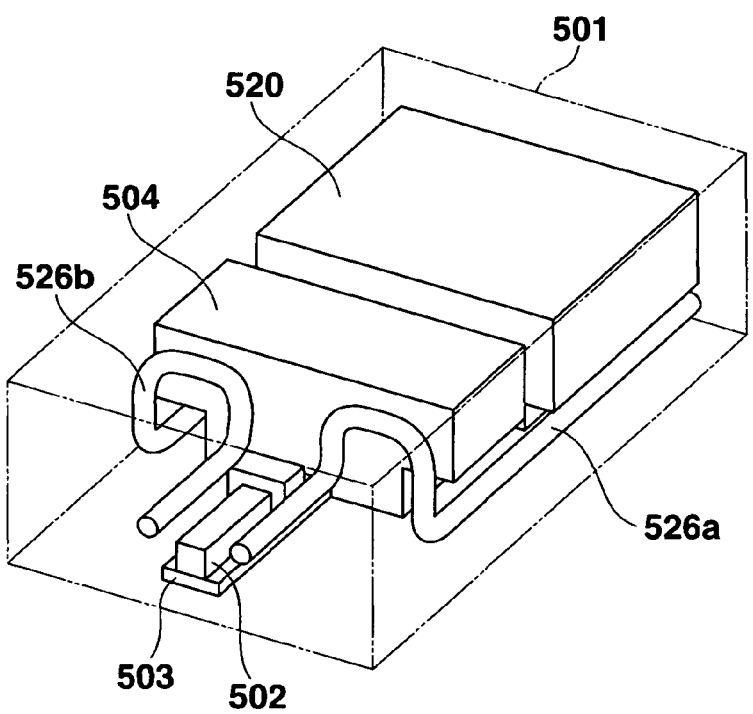

In addition, the anode output electrode and cathode output electrode may have a circular cross-section, in the manner of anode output electrode 526a and cathode output electrode 526b shown in FIG. 29.

The bends of the anode output electrode 521a and the cathode output electrode 521b at bending portions 523a and 523b need not be sharp right angles in the manner shown in FIGS. 19 and 20. Instead, the bending sites in the bending portions may be smoothly bent in a circular arc shape as shown in FIG. 28 or FIG. 29. With this structure, stress is restricted from concentrating at a bending site, whereby the stress can be dispersed entirely at a bending portion, and damage due to the stress can be restricted.

Figure 30:
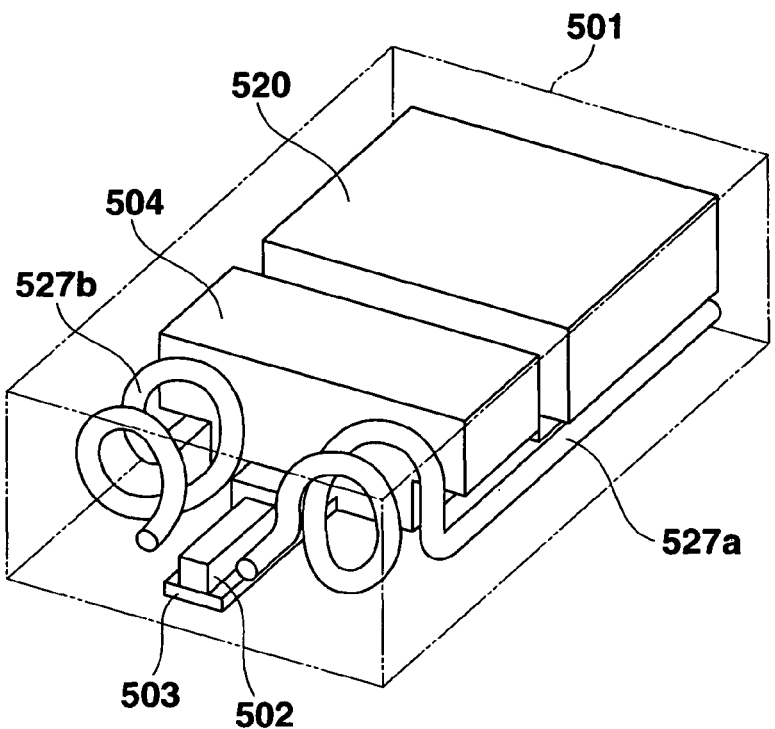

Alternatively, as shown in FIG. 30, an anode output electrode 527a and a cathode output electrode 527b having a stress relaxation structure formed in a coil shape in a space between an internal wall face of the heat insulation package 501 and the reformer 504 may be used. In this case, absorption of stress at a bending portion can be further better carried out, whereby damage due to stress can be prevented well.

Figure 31:
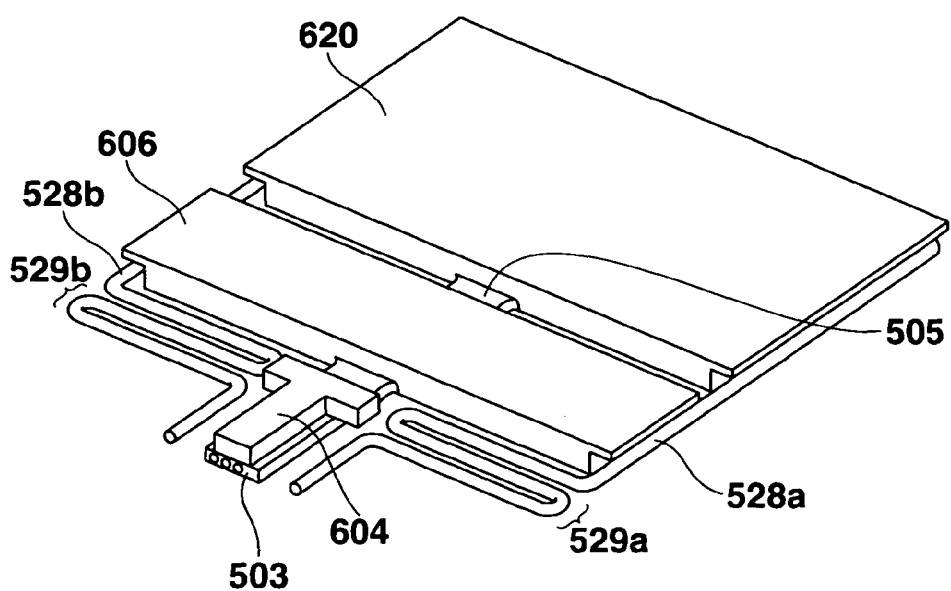

Moreover in order to reduce the thickness of the heat insulation package 501, when, for example, a thin vaporizer 604, a thin reformer 606, and a thin fuel cell portion 620 are used, an anode output electrode 528a and a cathode output electrode 528b having zigzag shaped bending portions 529a and 529b, as shown in FIG. 31, may be used.

What is claimed is:

1. A reactor device comprising:
a reactor including at least one reacting unit that is supplied with a reactant and causes a reaction;
a terminal portion provided at the reacting unit;
an electrically conductive member which comprises an electrically conductive material and which is connected to the terminal portion; and
a space which extends between the terminal portion and an end face of the reactor;
wherein the electrically conductive member is routed to outside the reactor through the space from the terminal portion to the end face of the reactor, and the electrically conductive member is fixed to the reactor at the end face;
wherein the reacting unit includes an electric heater to heat the reacting unit to a predetermined temperature;
wherein the terminal portion comprises a connection terminal through which a current is supplied to the electric heater;
wherein the electrically conductive member comprises a lead wire that is connected to the connection terminal;

wherein the reactor comprises a first substrate and a second substrate that are laminated together;

wherein the electric heater comprises an electric heat pattern formed on a first face side of the first substrate, two said connection terminals are provided on the first face side at respective ends of the electric heat pattern, two said lead wires are provided on the first face side and connected to the connection terminals, respectively, and a groove or recessed portion is formed in a second face side of the first substrate to form the reaction unit supplied with the reactant to cause the reaction;

wherein in a first face side of the second substrate, there are formed: (i) an electric heat pattern housing chamber, which has a shape that corresponds to the electric heat pattern formed on the first substrate and which comprises a space to house the electric heat pattern, (ii) two terminal portion housing chambers, each of which has a shape that corresponds a corresponding one of the connection terminals formed on the first substrate and each of which comprises a space to house the corresponding connection terminal, and (iii) two communication grooves, each of which extends between the electric heat pattern housing chamber and a corresponding one of the terminal portion housing chambers; and wherein the first face side of the second substrate is laminated to the first face side of the first substrate, so as to be opposed to the first face side of the first substrate.

2. The reactor device according to claim 1, wherein the lead wires are bent in the terminal portion housing chambers.

3. The reactor device according to claim 1, wherein two said spaces for respectively routing the lead wires to the outside are provided, and each said space comprises a routing groove which is formed in the first face side of the second substrate and through which the corresponding lead wire is drawn to the outside; and wherein each of the routing grooves is sealed by a sealing agent which fixes the lead wire in place.

4. The reactor device according to claim 1, wherein the terminal portion housing chambers are formed at positions that do not overlap the groove or recessed portion in the first substrate.

5. A reactor device comprising:

a reactor including at least one reacting unit that is supplied with a reactant and causes a reaction;

a terminal portion provided at the reacting unit;

an electrically conductive member which comprises an electrically conductive material and which is connected to the terminal portion; and a space which extends between the terminal portion and an end face of the reactor;

wherein the electrically conductive member is routed to outside the reactor through the space from the terminal portion to the end face of the reactor, and the electrically conductive member is fixed to the reactor at the end face, wherein the reacting unit includes an electric heater to heat the reacting unit to a predetermined temperature, wherein the terminal portion comprises a connection terminal through which a current is supplied to the electric heater, wherein the electrically conductive member comprises a lead wire that is connected to the connection terminal, wherein the reactor comprises a first substrate and a second substrate that are laminated together;

wherein the electric heater comprises an electric heat pattern formed on a first face side of the first substrate, two said connection terminals are provided on the first face side at respective ends of the electric heat pattern, and a groove or recessed portion is formed in a second face side of the first substrate to form the reacting unit supplied with the reactant to cause the reaction;

wherein two said lead wires are connected to the connection terminals, respectively, wherein two said spaces for respectively routing the lead wires to the outside are provided, and each of said spaces comprises a routing groove which is formed in a first face side of the second substrate and through which the corresponding lead wire is drawn to the outside, and the first face side of the second substrate is laminated to the first face side of the first substrate, so as to be opposed to the first face side of the first substrate;

wherein each of the routing grooves is sealed by a sealing agent which fixes the lead wire in place; and wherein each of the lead wires includes a bending portion positioned between the sealing agent and the terminal portion.

6. The reactor device according to claim 5, wherein, in the first face side of the second substrate, there are formed: (i) an electric heat pattern housing chamber, which has a shape that corresponds to the electric heat pattern formed on the first substrate and which houses the electric heat pattern; (ii) two terminal portion housing chambers, each of which has a shape that corresponds to a corresponding one of the connection terminals formed on the first substrate and each of which houses the connection terminal; and wherein the bending portion of each of the lead wires is housed in the corresponding terminal portion housing chamber.

7. The reactor device according to claim 6, wherein the terminal portion housing chambers are formed at positions that do not overlap the groove or recessed portion in the first substrate.

8. A reactor device comprising:

a reactor including at least one reacting unit that is supplied with a reactant and causes a reaction;

a terminal portion provided at the reacting unit;

an electrically conductive member which comprises an electrically conductive material and which is connected to the terminal portion; and a space which extends between the terminal portion and an end face of the reactor;

wherein the electrically conductive member is routed to outside the reactor through the space from the terminal portion to the end face of the reactor, and the electrically conductive member is fixed to the reactor at the end face;

wherein the reacting unit comprises an electric power generation cell which is set at a predetermined temperature and supplied with a power generation fuel, and which generates electric power by an electrochemical reaction of the power generation fuel;

wherein the terminal portion comprises an output terminal which outputs the electric power from the electric power generation cell, and wherein the electrically conductive member comprises an output electrode connected to the output terminal.

9. The reactor device according to claim 8, wherein the reactor comprises a heat insulation container which houses the reacting unit via a heat insulation space, and wherein the output electrode is routed through a wall face of the heat insulation container so as to be drawn to the outside, and fixed at a site at which the output electrode is routed through the wall face.

10. The reactor device according to claim 9, wherein the reacting unit further comprises a reformer which is set at a lower temperature than a temperature of the electric power generation cell, and which is supplied with a source fuel to generate the power generation fuel, and
wherein a distance from the wall face of the heat insulation container through which the output electrode is drawn to the electric power generation cell is longer than a distance from the wall face to the reformer.

11. The reactor device according to claim 8, wherein the electric power generation cell comprises a solid oxide electrolyte.

12. The reactor device according to claim 8, wherein a sectional shape of the output electrode is one of a square, a triangle, and a circle.

13. The reactor device according to claim 8, wherein the reacting unit includes a cabinet which houses the electric power generation cell, and through which the output electrode is passed, and the output electrode and the cabinet are made of the same material.

14. The reactor device according to claim 13, wherein the cabinet and the output electrode are made of a Ni-based alloy.

15. The reactor device according to claim 9, wherein the output electrode includes a stress relaxation structure comprising a plurality of bending sites positioned between the heat insulation container and the electric power generation cell.

16. The reactor device according to claim 15, wherein the output electrode is bent at a right angle at at least one of the bending sites in the stress relaxation structure.

17. The reactor device according to claim 15, wherein the output electrode is bent in an arc shape at at least one of the bending sites in the stress relaxation structure.

18. The reactor device according to claim 15, wherein the output electrode is bent in a zigzag shape in the stress relaxation structure.

19. A reactor device comprising:
a plurality of reacting units which are set at different temperatures and each of which is supplied with a reactant to cause reaction;
a heat insulation container which houses the plurality of reacting units via a heat insulation space;
a terminal portion provided at one of the reacting units at which the set temperature is highest; and
an electrically conductive member, which comprises an electrically conductive material and which is connected to the terminal portion;
wherein the electrically conductive member is routed through a wall face of the heat insulation container so as to be drawn to the outside, and the electrically conductive member is fixed at a site at which the electrically conductive member is routed through the wall face; and
wherein a distance from the wall face of the heat insulation container through which the electrically conductive member is drawn to the reacting unit at which the terminal portion is provided is longer than a distance from the wall face to any other of the reacting units.

20. The reactor device according to claim 19, wherein the reacting units comprise a reformer which is supplied with a source fuel to generate a power generation fuel, and an electric power generation cell which is set to a higher temperature than the reformer and which is supplied with the power generation fuel to generate electric power by an electrochemical reaction of the power generation fuel;
wherein the terminal portion comprises an output terminal which outputs the electric power from the electric power generation cell, and
wherein the electrically conductive member comprises an output electrode connected to the output terminal.

21. The reactor device according to claim 19, wherein the electric power generation cell comprises a solid oxide electrolyte.

22. The reactor device according to claim 19, wherein a sectional shape of the output electrode is one of a square, a triangle, and a circle.

23. The reactor device according to claim 19, further comprising a cabinet which houses the electric power generation cell, and through which the output electrode is routed;
wherein the output electrode and the cabinet are made of the same material.

24. The reactor device according to claim 23, wherein the cabinet and the output electrode are made of a Ni-based alloy.

25. The reactor device according to claim 19, wherein the output electrode includes a stress relaxation structure comprising a plurality of bending sites between the heat insulation container and the electric power generation cell.

26. Electronic equipment comprising:
a reactor device comprising:
a reacting unit which is set at a predetermined temperature, and which comprises an electric power generation cell that is supplied with a power generation fuel to generate electric power by an electrochemical reaction of the power generation fuel, and a heat insulation container which houses the reacting unit via a heat insulation space;
a connection terminal which is provided at the electric power generation cell and which comprises an output terminal that outputs the electric power; and an output electrode which: (i) comprises an electrically conductive member, (ii) is connected to the output terminal and routed through a wall face of the heat insulation container to be drawn to the outside, and (iii) is fixed at a site at which the output electrode is routed through the wall face,
wherein a load is driven based on the electric power generated by the electric power generation cell in the reactor device, and
wherein the output electrode includes a stress relaxation structure comprising a plurality of bending sites positioned between the heat insulation container and the electric power generation cell.

27. The electronic equipment according to claim 26, wherein the electric power generation cell comprises a solid oxide electrolyte.

28. An electronic equipment comprising:
a reactor device comprising:
a reformer which is supplied with a source fuel to generate a power generation fuel;
an electric power generation cell which is set at a higher temperature than the reformer, and which is supplied with the power generation fuel to generate electric power by an electrochemical reaction of the power generation fuel;
a heat insulation container which houses the reformer and the electric power generation cell via a heat insulation space;
a connection terminal which is provided at the electric power generation cell and which comprises an output terminal that outputs the electric power; and
an output electrode which comprises a first end that is connected to the output terminal and a second end that is routed through a wall face of the heat insulation container to be drawn to the outside, and which is fixed at a site at which the output electrode is routed through the wall face;

wherein a distance from the wall face through which the output electrode is routed to the electric power generation cell is longer than a distance from the wall face to the reformer; and wherein a load is coupled to the second end of the output electrode of the fuel cell device, and the load is driven by the electric power generated by the electric power generation cell.

29. The electronic equipment according to claim 28, wherein the electric power generation cell comprises a solid oxide electrolyte.

30. The electronic equipment according to claim 28, wherein the output electrode includes a stress relaxation structure comprising a plurality of bending sites positioned between the heat insulation container and the electric power generation cell.

* * * * *